US012798371B2

(12) United States Patent
Crick et al.

(10) Patent No.: US 12,798,371 B2
(45) **Date of Patent: *Nov. 17, 2026**

(54) CRUISE CONTROL USER INTERFACES

(71) Applicant: Apple Inc., Cupertino, CA (US)

(72) Inventors: Benjamin J. Crick, San Francisco, CA (US); Conrad H. Albrecht-Buehler, Sunnyvale, CA (US); Joseph Y. Chan, San Francisco, CA (US); Richard R. Dellinger, San Jose, CA (US); Yun Jae Kim, Sunnyvale, CA (US); Eileen Y. Lee, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 19/088,769

(22) Filed: Mar. 24, 2025

(65) Prior Publication Data

US 2025/0222766 A1 Jul. 10, 2025

Related U.S. Application Data

(63) Continuation of application No. 18/103,376, filed on Jan. 30, 2023, now Pat. No. 12,257,900.

(Continued)

(51) Int. Cl.
*B60K 35/00* (2024.01)
*B60K 35/28* (2024.01)
(Continued)

(52) U.S. Cl.
CPC .............. *B60K 35/00* (2013.01); *B60K 35/28* (2024.01); *B60K 35/29* (2024.01); *B60K 35/81* (2024.01);
(Continued)

(58) Field of Classification Search
CPC ........ B60K 35/00; B60K 35/28; B60K 35/29; B60K 35/81; B60K 35/60; B60K 35/10;
(Continued)

(56) References Cited

U.S. PATENT DOCUMENTS 6,693,523 B1 * 2/2004 Abel ...................... B60K 35/22 340/461
10,019,136 B1 7/2018 Ozog
(Continued)

FOREIGN PATENT DOCUMENTS

CN 103764429 A 4/2014
CN 114248624 A 3/2022
(Continued)

OTHER PUBLICATIONS

Applicant-Initiated Interview Summary received for U.S. Appl. No. 18/204,876, mailed on Jul. 24, 2025, 2 pages.

(Continued)

*Primary Examiner* — Hai H Huynh
(74) *Attorney, Agent, or Firm* — YHE Law LLP

(57) ABSTRACT

The present disclosure generally relates to managing cruise control settings. A cruise control indicator is displayed at a location that corresponds to a cruise control speed concurrently with a textual indication of the cruise control speed. In response to receiving an input to change the cruise control speed, the cruise control indicator and the textual indication of the cruise control speed move along at least a portion of the path corresponding to speed.

30 Claims, 15 Drawing Sheets

Related U.S. Application Data

(60) Provisional application No. 63/397,869, filed on Aug. 14, 2022.

(51) Int. Cl.
*B60K 35/29* (2024.01)
*B60K 35/81* (2024.01)

(52) U.S. Cl.
CPC .... *B60K 2360/172* (2024.01); *B60K 2360/18* (2024.01)

(58) Field of Classification Search
CPC .... B60K 35/213; B60K 35/214; B60K 35/22; B60K 2360/172; B60K 2360/18; B60K 2360/166; B60K 2360/167; B60K 2360/168; B60K 2360/169; B60K 2360/191; B60K 2310/22
USPC .............................................. 701/70, 36, 48
See application file for complete search history.

(56) References Cited

U.S. PATENT DOCUMENTS

| | | | | |
|---|---|---|---|---|
| 11,312,207 | B1 | 4/2022 | Sanders et al. | |
| 11,489,726 | B2 | 11/2022 | Ichieda et al. | |
| 11,511,756 | B2 | 11/2022 | Brown et al. | |
| 11,639,181 | B2 * | 5/2023 | Flotkoetter | B60K 35/10 340/435 |
| 11,656,586 | B1 | 5/2023 | Puskarich | |
| 11,678,386 | B2 | 6/2023 | Ichieda et al. | |
| 2009/0089689 | A1 | 4/2009 | Clark et al. | |
| 2014/0330951 | A1 | 11/2014 | Sukoff et al. | |
| 2015/0254041 | A1 * | 9/2015 | Hoshihara | B60K 35/10 345/173 |
| 2016/0370984 | A1 | 12/2016 | Kuhn et al. | |
| 2018/0001767 | A1 * | 1/2018 | Hall | B60K 35/10 |
| 2018/0081515 | A1 | 3/2018 | Block et al. | |
| 2019/0191206 | A1 | 6/2019 | Stachewicz et al. | |
| 2022/0093050 | A1 | 3/2022 | Yamada | |
| 2023/0234441 | A1 * | 7/2023 | Sung | B60K 35/10 |
| 2023/0364994 | A1 * | 11/2023 | Nadaya | B60K 35/10 |
| 2025/0033475 | A1 * | 1/2025 | Kawakami | B60K 35/00 |

FOREIGN PATENT DOCUMENTS

| | | | |
|---|---|---|---|
| JP | 2008-206301 | A | 9/2008 |
| JP | 2012-56384 | A | 3/2012 |
| WO | 2013/035887 | A2 | 3/2013 |

OTHER PUBLICATIONS

Non-Final Office Action received for U.S. Appl. No. 18/510,050, mailed on Jul. 16, 2025, 32 pages.
Applicant-Initiated Interview Summary received for U.S. Appl. No. 18/510,050, mailed on Jun. 20, 2025, 6 pages.
Decision to Grant received for European Patent Application No. 20729345.7, mailed on Jul. 3, 2025, 2 pages.
Final Office Action received for U.S. Appl. No. 18/204,876, mailed on Jun. 25, 2025, 9 pages.
Final Office Action received for U.S. Appl. No. 18/510,050, mailed on Jun. 10, 2025, 28 pages.
Intention to Grant received for European Patent Application No. 20729345.7, mailed on May 27, 2025, 8 pages.
Decision to Grant received for European Patent Application No. 17813879.8, mailed on Sep. 11, 2025, 2 pages.
Extended European Search Report received for European Patent Application No. 25181857.1, mailed on Sep. 18, 2025, 9 pages.
Applicant-Initiated Interview Summary received for U.S. Appl. No. 18/510,050, mailed on Aug. 1, 2025, 7 pages.
Intention to Grant received for European Patent Application No. 17813879.8, mailed on Apr. 28, 2025, 9 pages.
Advisory Action received for U.S. Appl. No. 18/510,050, mailed on Dec. 31, 2024, 6 pages.
Applicant-Initiated Interview Summary received for U.S. Appl. No. 18/510,050, mailed on Feb. 18, 2025, 7 pages.
Intention to Grant received for European Patent Application No. 20729345.7, mailed on Feb. 27, 2025, 9 pages.
International Preliminary Report on Patentability received for PCT Patent Application No. PCT/US2023/024293, mailed on Dec. 19, 2024, 15 pages.
International Preliminary Report on Patentability received for PCT Patent Application No. PCT/US2023/030104, mailed on Feb. 27, 2025, 8 pages.
Non-Final Office Action received for U.S. Appl. No. 18/204,876, mailed on Jan. 27, 2025, 14 pages.
Non-Final Office Action received for U.S. Appl. No. 18/510,050, mailed on Jan. 28, 2025, 25 pages.
Corrected Notice of Allowance received for U.S. Appl. No. 18/510,050, mailed on Oct. 22, 2025, 2 pages.
Applicant-Initiated Interview Summary received for U.S. Appl. No. 18/204,876, mailed on Apr. 2, 2025, 5 pages.
Notice of Allowance received for U.S. Appl. No. 18/204,876, mailed on Aug. 27, 2025, 8 pages.
Notice of Allowance received for U.S. Appl. No. 18/510,050, mailed on Sep. 3, 2025, 8 pages.
Office Action received for Chinese Patent Application No. 202380059624.8, mailed on Jul. 27, 2025, 24 pages (13 pages of English Translation and 11 pages of Official Copy).

* cited by examiner

CRUISE CONTROL USER INTERFACES

CROSS REFERENCE TO RELATED APPLICATIONS

This application is a continuation of U.S. Nonprovisional application Ser. No. 18/103,376, entitled "CRUISE CONTROL USER INTERFACES," filed Jan. 30, 2023, claims the benefit of U.S. Provisional Application No. 63/397,869, entitled "CRUISE CONTROL USER INTERFACES," filed Aug. 14, 2022, the contents of which are hereby incorporated by reference in their entirety for all purposes.

FIELD

The present disclosure relates generally to computer user interfaces, and more specifically to techniques for managing cruise control settings.

BACKGROUND

Cruise control is a feature for controlling speed, such as of a vehicle. There are several types of cruise control, including convention cruise control and adaptive cruise control. Conventional cruise control typically maintains a fixed speed. Adaptive cruise control typically automatically adjusts the speed based on traffic conditions, such as the speed of a leading vehicle.

BRIEF SUMMARY

Some techniques for managing cruise control settings using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing cruise control settings. Such methods and interfaces optionally complement or replace other methods for managing cruise control settings. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system, wherein the computer system is in communication with one or more display generation components and one or more input devices: concurrently displaying, via the one or more display generation components and as part of an instrument cluster: a cruise control indicator at a location that corresponds to a cruise control speed, and a textual indication of the cruise control speed; while concurrently displaying the cruise control indicator and the textual indication of the cruise control speed, receiving, via the one or more input devices, a first input; and in response to receiving the first input, ceasing to display, via the one or more display generation components, the textual indication of the cruise control speed after a non-zero duration while continuing to display, via the one or more display generation components, the cruise control indicator at the location that corresponds to the cruise control speed.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: concurrently displaying, via the one or more display generation components and as part of an instrument cluster: a cruise control indicator at a location that corresponds to a cruise control speed, and a textual indication of the cruise control speed; while concurrently displaying the cruise control indicator and the textual indication of the cruise control speed, receiving, via the one or more input devices, a first input; and in response to receiving the first input, ceasing to display, via the one or more display generation components, the textual indication of the cruise control speed after a non-zero duration while continuing to display, via the one or more display generation components, the cruise control indicator at the location that corresponds to the cruise control speed.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: concurrently displaying, via the one or more display generation components and as part of an instrument cluster: a cruise control indicator at a location that corresponds to a cruise control speed, and a textual indication of the cruise control speed; while concurrently displaying the cruise control indicator and the textual indication of the cruise control speed, receiving, via the one or more input devices, a first input; and in response to receiving the first input, ceasing to display, via the one or more display generation components, the textual indication of the cruise control speed after a non-zero duration while continuing to display, via the one or more display generation components, the cruise control indicator at the location that corresponds to the cruise control speed.

In accordance with some embodiments, a computer system is described. The computer system is configured to communicate with one or more display generation components and one or more input devices and comprises: one or more processors; and memory storing one or more programs configured to be executed by the one or more processors, the one or more programs including instructions for: concurrently displaying, via the one or more display generation components and as part of an instrument cluster: a cruise control indicator at a location that corresponds to a cruise control speed, and a textual indication of the cruise control speed; while concurrently displaying the cruise control indicator and the textual indication of the cruise control speed, receiving, via the one or more input devices, a first input; and in response to receiving the first input, ceasing to display, via the one or more display generation components, the textual indication of the cruise control speed after a non-zero duration while continuing to display, via the one or more display generation components, the cruise control indicator at the location that corresponds to the cruise control speed.

In accordance with some embodiments, a computer system configured to communicate with one or more display generation components and one or more input devices is described. The computer system comprises: means for concurrently displaying, via the one or more display generation components and as part of an instrument cluster: a cruise control indicator at a location that corresponds to a cruise control speed, and a textual indication of the cruise control speed; means, while concurrently displaying the cruise control indicator and the textual indication of the cruise control speed, for receiving, via the one or more input devices, a first input; and means, responsive to receiving the first input, for ceasing to display, via the one or more display generation components, the textual indication of the cruise control speed after a non-zero duration while continuing to display, via the one or more display generation components, the cruise control indicator at the location that corresponds to the cruise control speed.

In accordance with some embodiments, a computer program product is described. The computer program product comprises one or more programs configured to be executed by one or more processors of a computer system that is in communication with one or more display generation components and one or more input devices, the one or more programs including instructions for: concurrently displaying, via the one or more display generation components and as part of an instrument cluster: a cruise control indicator at a location that corresponds to a cruise control speed, and a textual indication of the cruise control speed; while concurrently displaying the cruise control indicator and the textual indication of the cruise control speed, receiving, via the one or more input devices, a first input; and in response to receiving the first input, ceasing to display, via the one or more display generation components, the textual indication of the cruise control speed after a non-zero duration while continuing to display, via the one or more display generation components, the cruise control indicator at the location that corresponds to the cruise control speed.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing cruise control settings, thereby increasing the effectiveness, efficiency, and user satisfaction with such devices. Such methods and interfaces may complement or replace other methods for managing cruise control settings.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
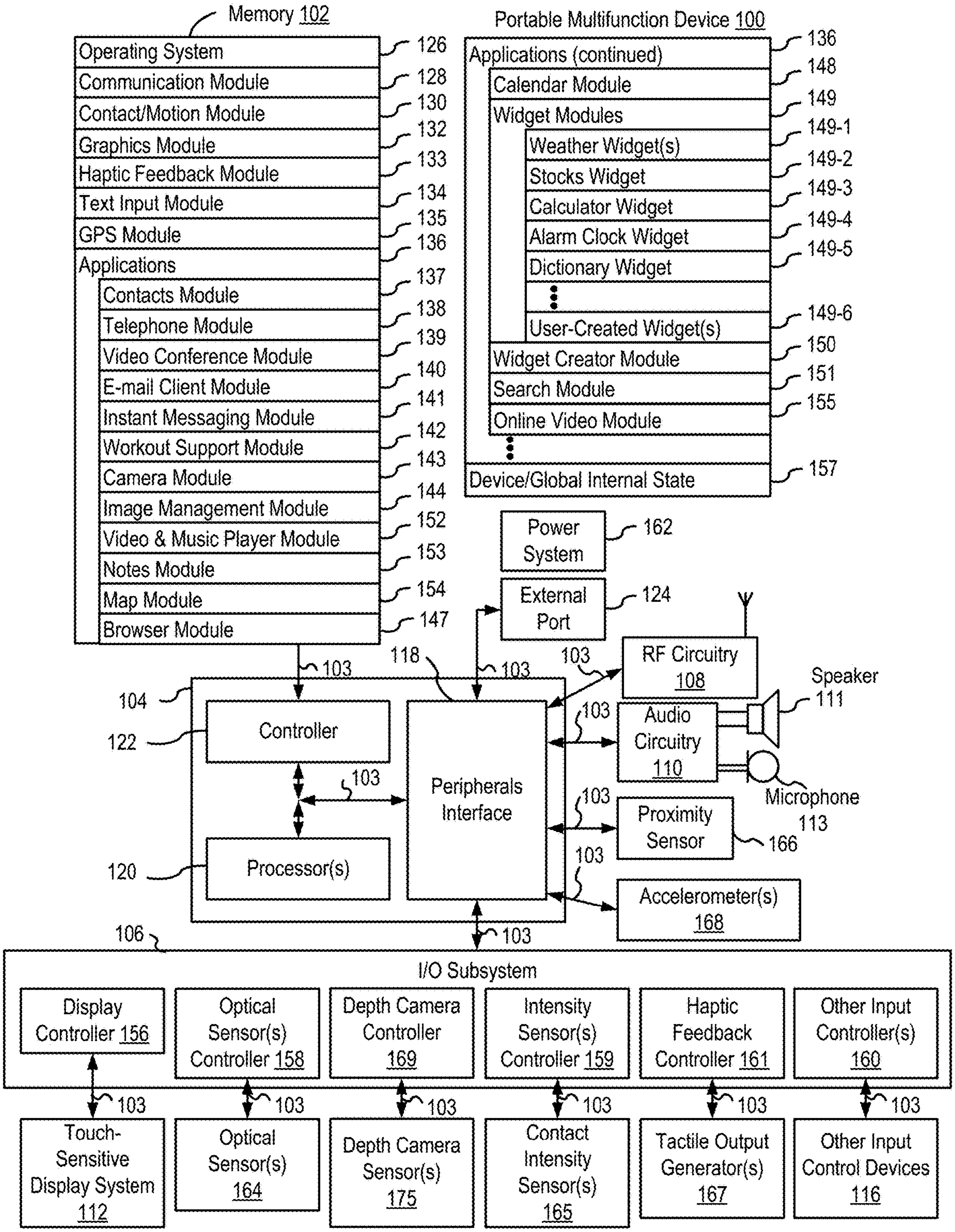
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing cruise control settings. Such techniques can reduce the cognitive burden on a user who uses cruise control, thereby enhancing productivity and increasing safety. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing event notifications. FIGS. 6A-6L illustrate exemplary techniques for managing cruise control settings, in accordance with some embodiments. FIG. 7 is a flow diagram illustrating methods of managing cruise control settings, in accordance with some embodiments. The user interfaces in FIGS. 6A-6L are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term “intensity” of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term “tactile output” refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user’s sense of touch. For example, in situations where the device or the component of the device is in contact with a surface of a user that is sensitive to touch (e.g., a finger, palm, or other part of a user’s hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a “down click” or “up click” of a physical actuator button. In some cases, a user will feel a tactile sensation such as an “down click” or “up click” even when there is no movement of a physical actuator button associated with the touch-sensitive surface that is physically pressed (e.g., displaced) by the user’s movements. As another example, movement of the touch-sensitive surface is, optionally, interpreted or sensed by the user as “roughness” of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an “up click,” a “down click,” “roughness”), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser.

No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
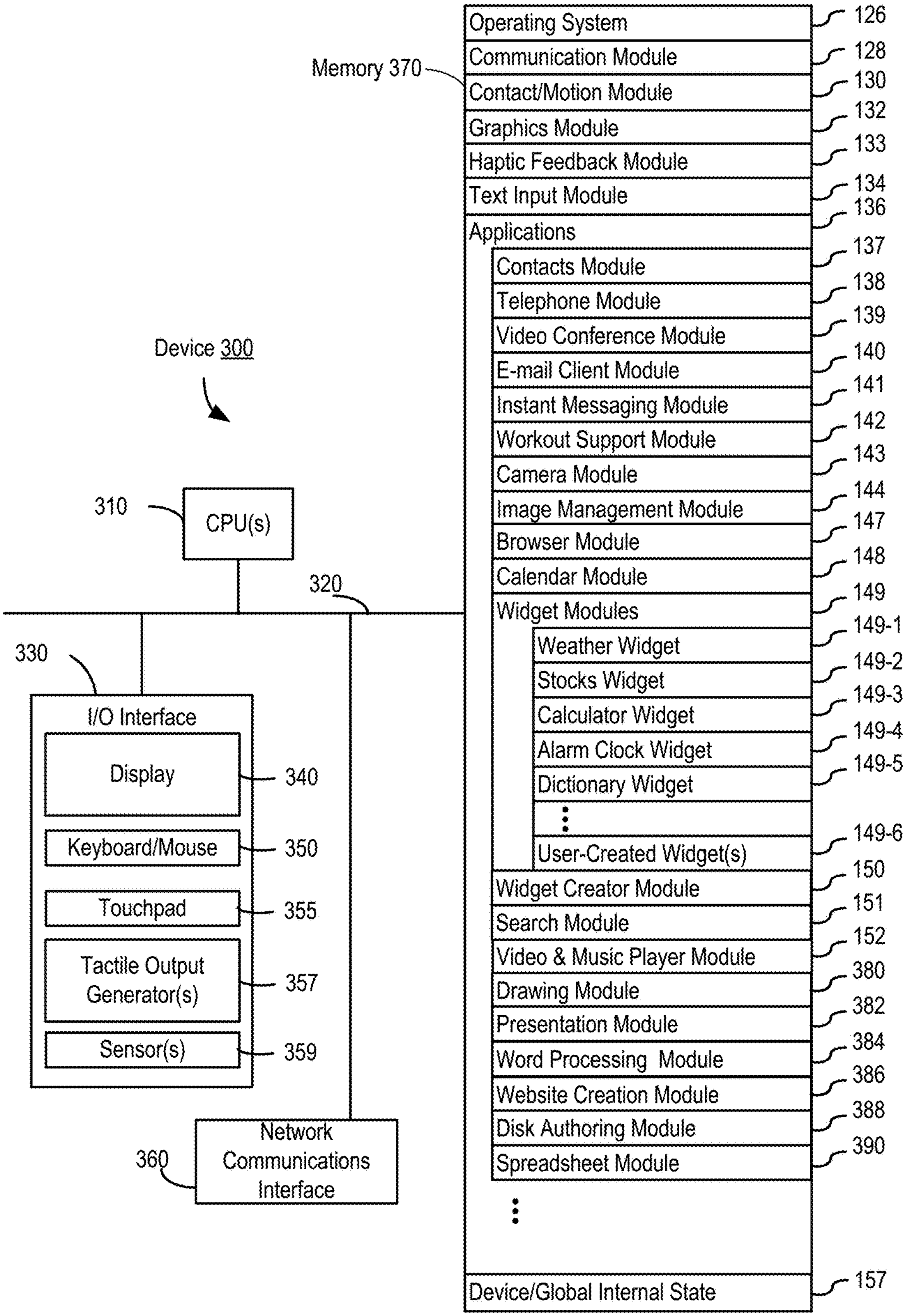
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
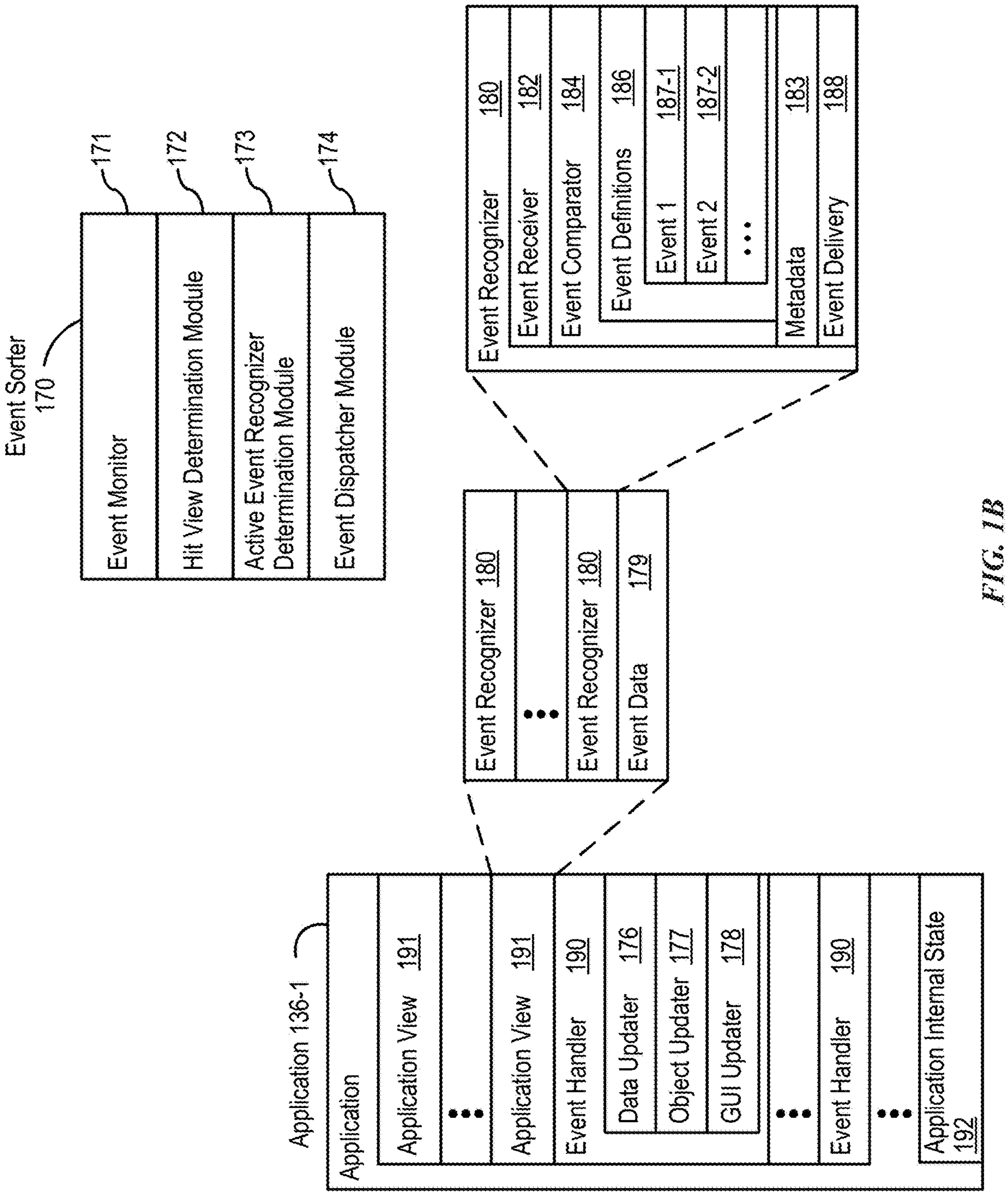
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
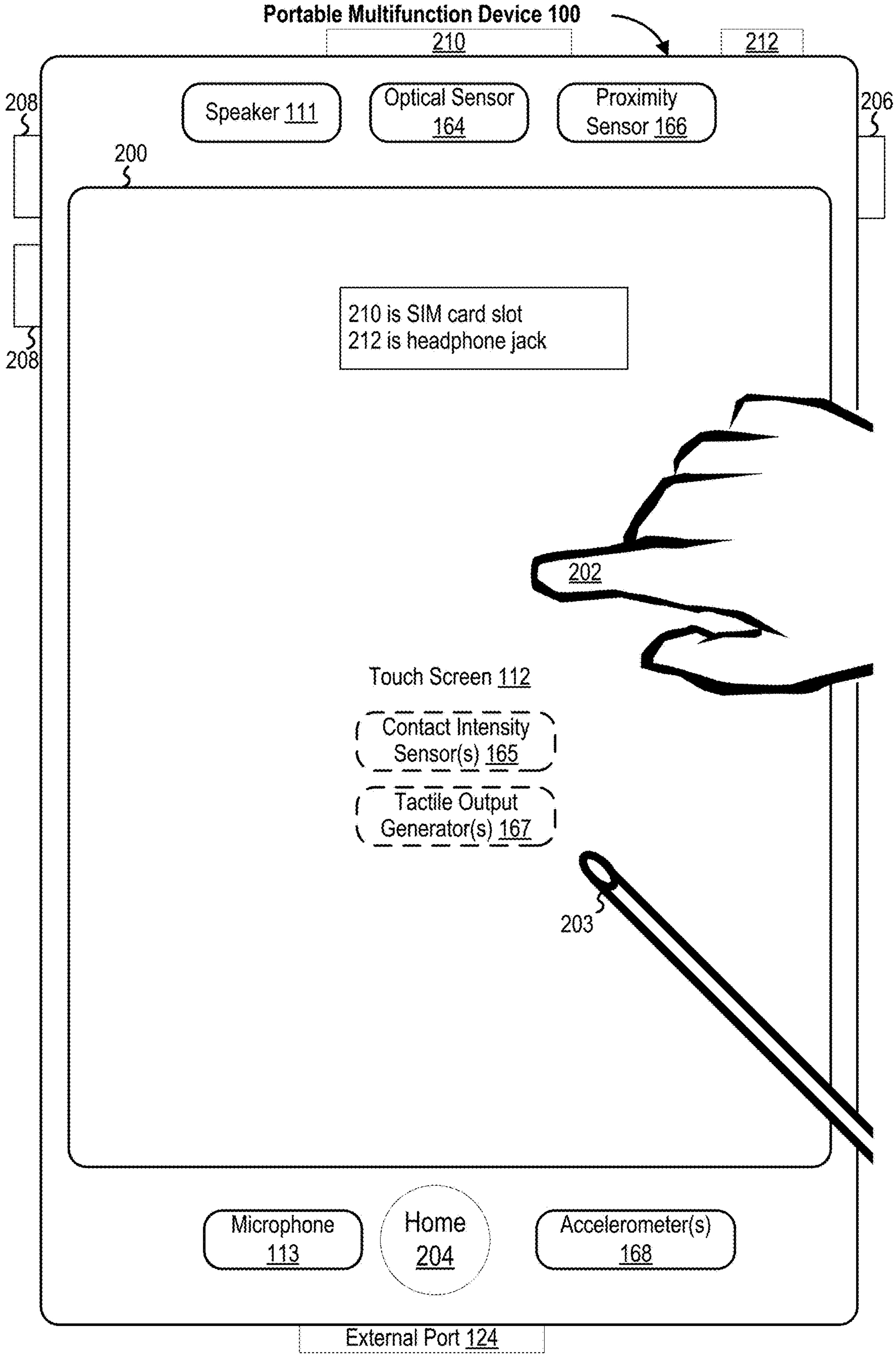
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
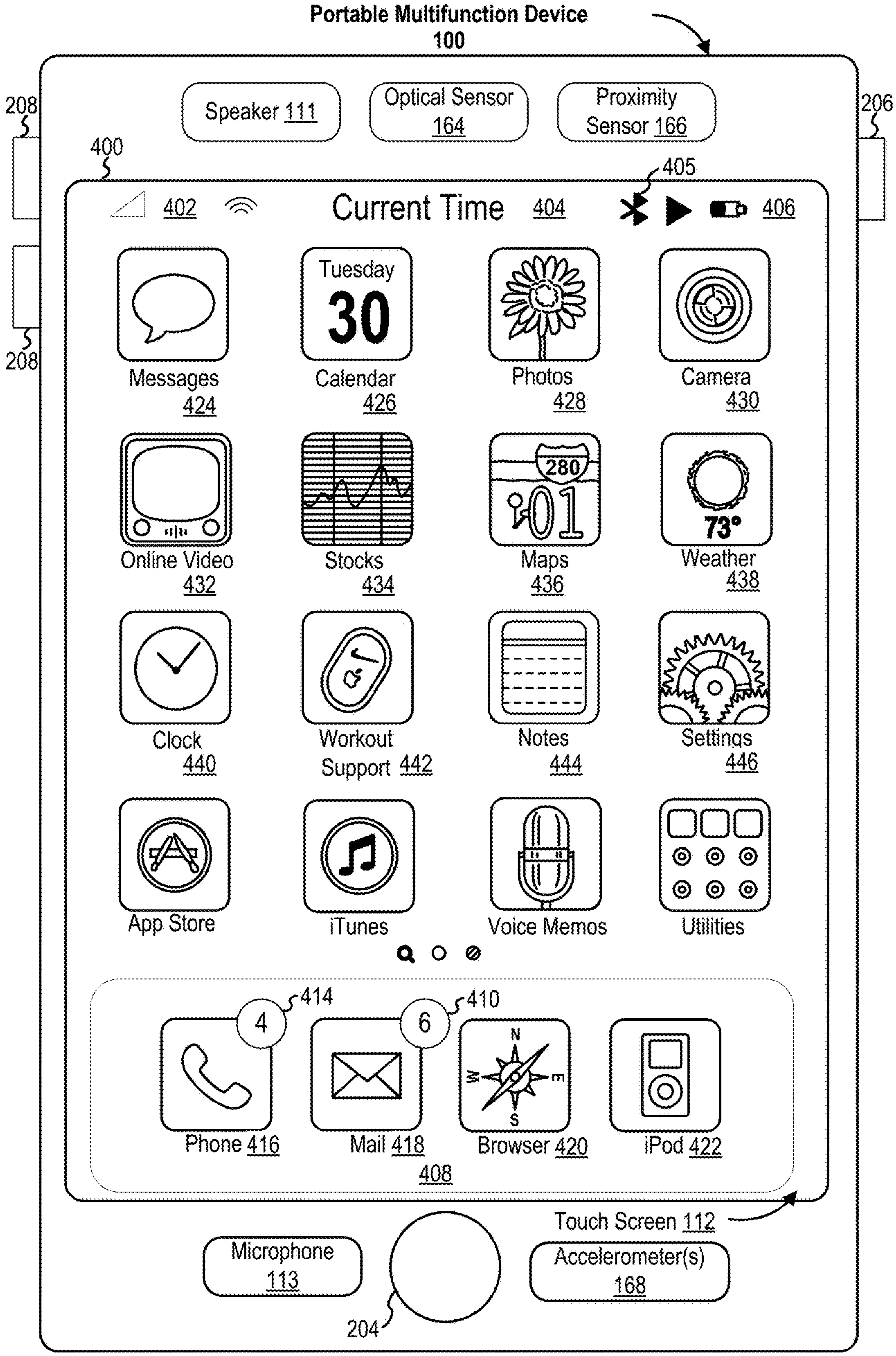
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
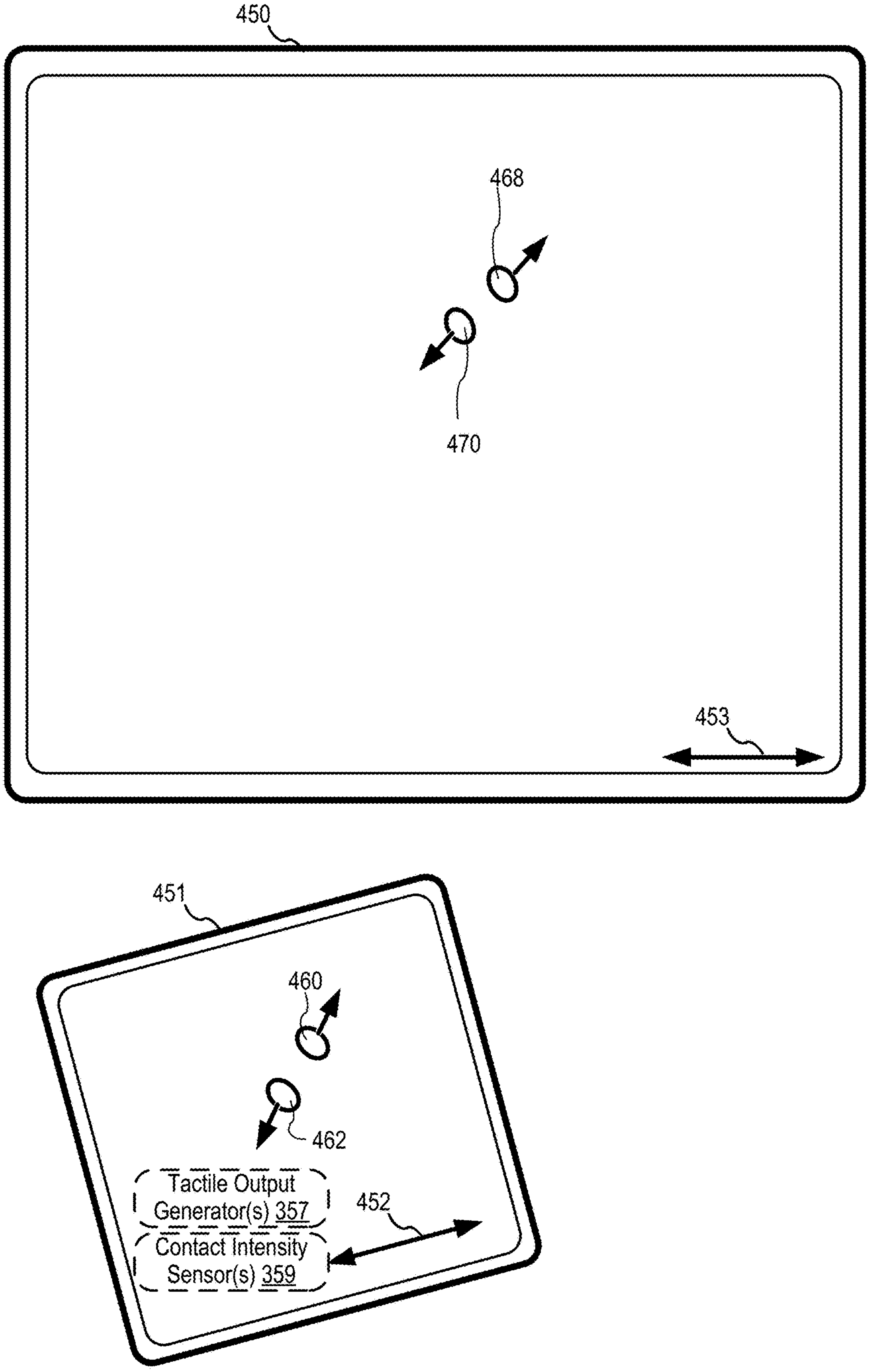
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
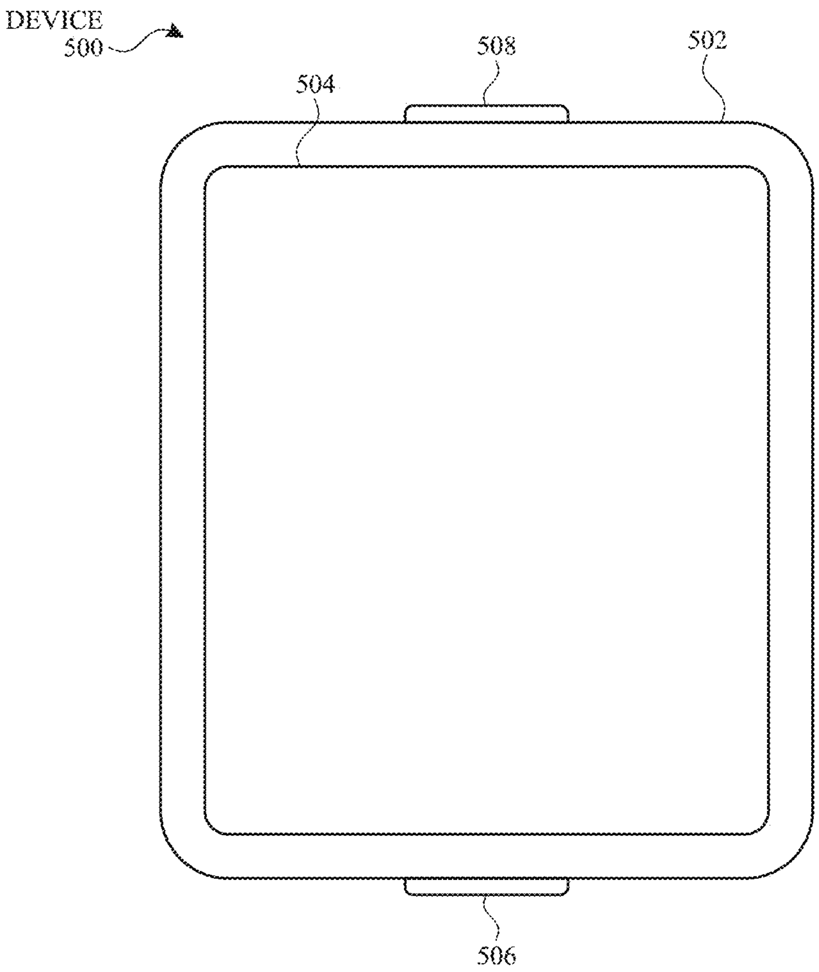
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
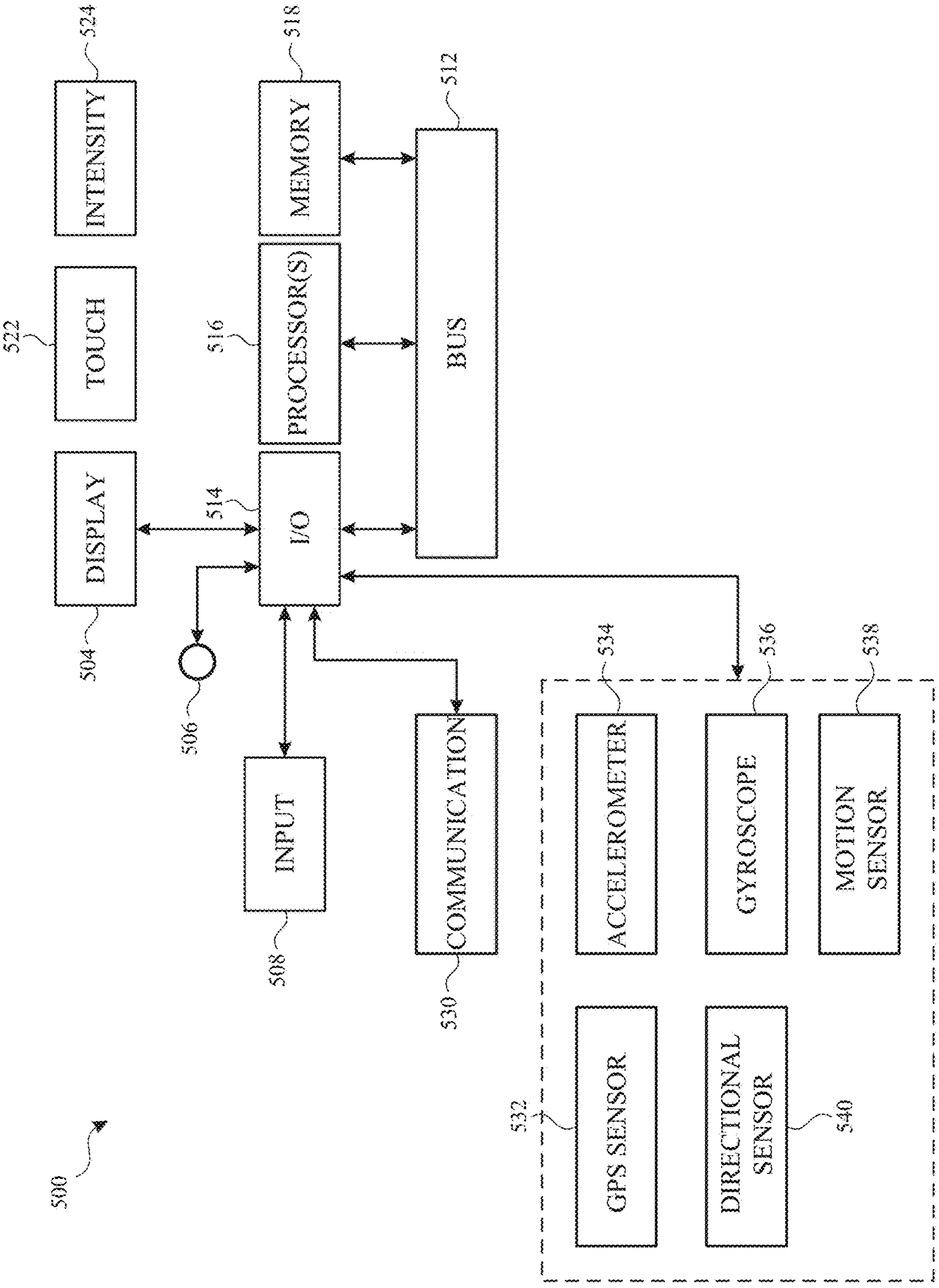
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6L illustrate exemplary user interfaces for managing cruise control, in accordance with some embodiments. The user interfaces in these figures are used to illustrate the processes described below, including the processes in FIG. 7.

Figure 6A:
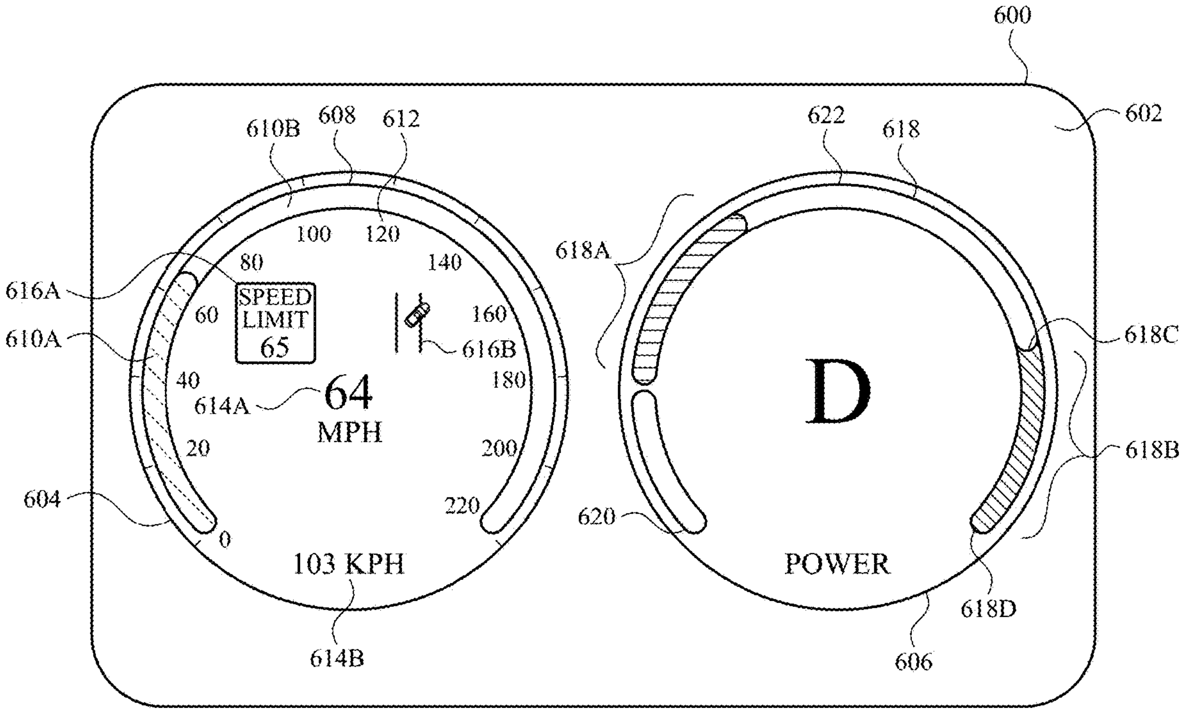
FIGS. 6A-6L illustrate exemplary techniques for managing cruise control settings, in accordance with some embodiments.
Figure 7:
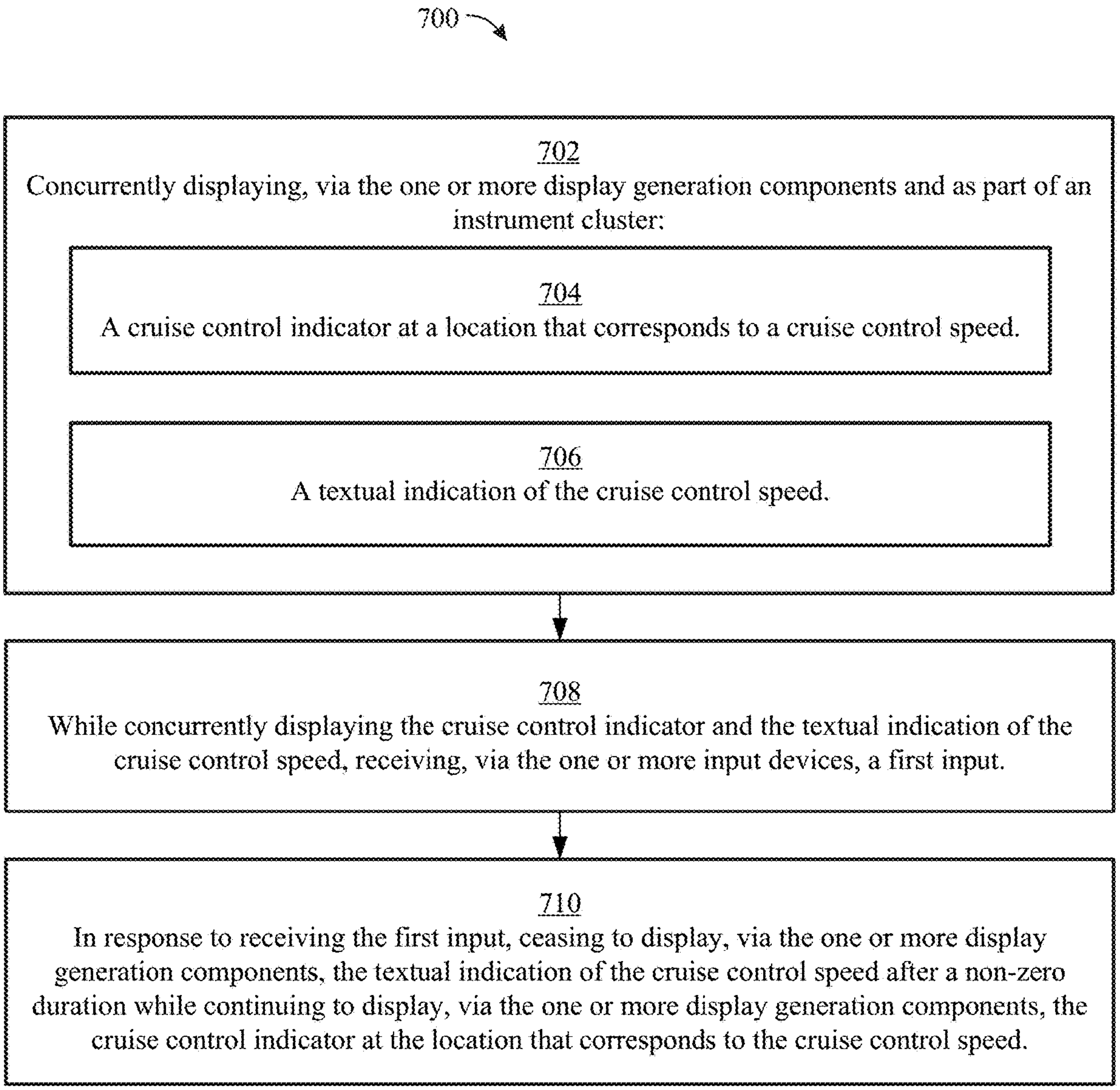
FIG. 7 is a flow diagram illustrating methods of managing cruise control settings, in accordance with some embodiments.

FIG. 6A illustrates computer system 600 with display 602. In some embodiments, computer system 600 is integrated into a vehicle and/or is in communication with a vehicle. In some embodiments, computer system 600 includes two displays. In some embodiments, computer system 600 is part of a user-wearable device, such as a headset. In some embodiments, computer system 600 includes one or more features of electronic devices 100, 300, and 500, as described above.

At FIG. 6A, computer system 600 displays an instrument cluster that includes speedometer gauge 604 and power gauge 606. Speedometer gauge 604 provides an indication of speed, such as a current speed of travel of the vehicle or of computer system 600. Speedometer gauge 604 includes path 608. In some embodiments, the path is not visually displayed. In this embodiment, path 608 is displayed in the shape of an arc. In some embodiments, path 608 is not in the shape of an arc and is, for example, a straight line or another shape. Indications 612 along path 608 indicate portions of path 608 that correspond to different speeds. For example, "120" is displayed adjacent to the portion of path 608 that corresponds to a speed of 120 mph. For another example, "40" is displayed adjacent to the portion of path 608 that corresponds to a speed of 40 mph. Speedometer gauge 604 indicates the speed of the vehicle in three ways: filling a first portion 610A of path 608 without filling a second portion 610B of path 608, numeric mph speed indicator 614A, and numeric kph speed indicator 614B.

At FIG. 6A, first portion 610A of path 608 indicates, based on how far along path 608 first portion 610A has extended and/or the location of first portion 610A, that the speed is 64 mph. Similarly, numeric mph speed indicator 614A indicates a speed of 64 mph and numeric kph speed indicator 614B indicates a corresponding speed of 103 kph. As a result, a user of computer system 600 can quickly and accurately visually determine the speed of the vehicle. Speedometer gauge 604 also includes speed limit indicator 616A, which provides an indication of the speed limit for the current location (e.g., street or freeway), and lane guidance indicator 616B, which indicates that the driving lane is being monitored and the user will be notified (e.g., visual, audio, and/or tactile warnings) if the vehicle unintentionally departs the driving lane. At FIG. 6A, computer system 600 does not display a cruise control indicator because cruise control is not set/enabled.

At FIG. 6A, power gauge 606 includes path 618, which includes a first portion 620 and a second portion 622. Path 618 is used to indicate an amount of power, such as an amount of power being produced or stored (along first portion 620) and/or an amount of power being used (along second portion 622). When no power is being used and no power is being generated, neither first portion 620 nor second portion 622 has any fill. At FIG. 6A, the vehicle is traveling and an amount of power being used for the travel is indicated by path 618 being filled by fill 618A to a level that corresponds to the amount of power currently being used. Fill 618B indicates the amount of power that is currently unavailable because power is limited (e.g., indicates maximum power). For example, power can be limited because the batteries of the vehicle are cold and therefore cannot currently produce the full amount of power and/or based on limits placed by the vehicle to facilitate the vehicle arriving at a destination with limited battery power (e.g., user has entered a destination and the vehicle determines that hard acceleration will result in not enough battery power to arrive at the destination). At FIG. 6A, end 618C of fill 618B indicates the maximum currently available useable power and end 618D of fill 618B indicates the maximum power (e.g., under ideal conditions). At FIG. 6A, the vehicle begins accelerating. In addition, computer system 600 detects a user input to activate cruise control and, in response, activates cruise control and updates the instrument cluster accordingly, as shown in FIG. 6B.

Figure 6B:
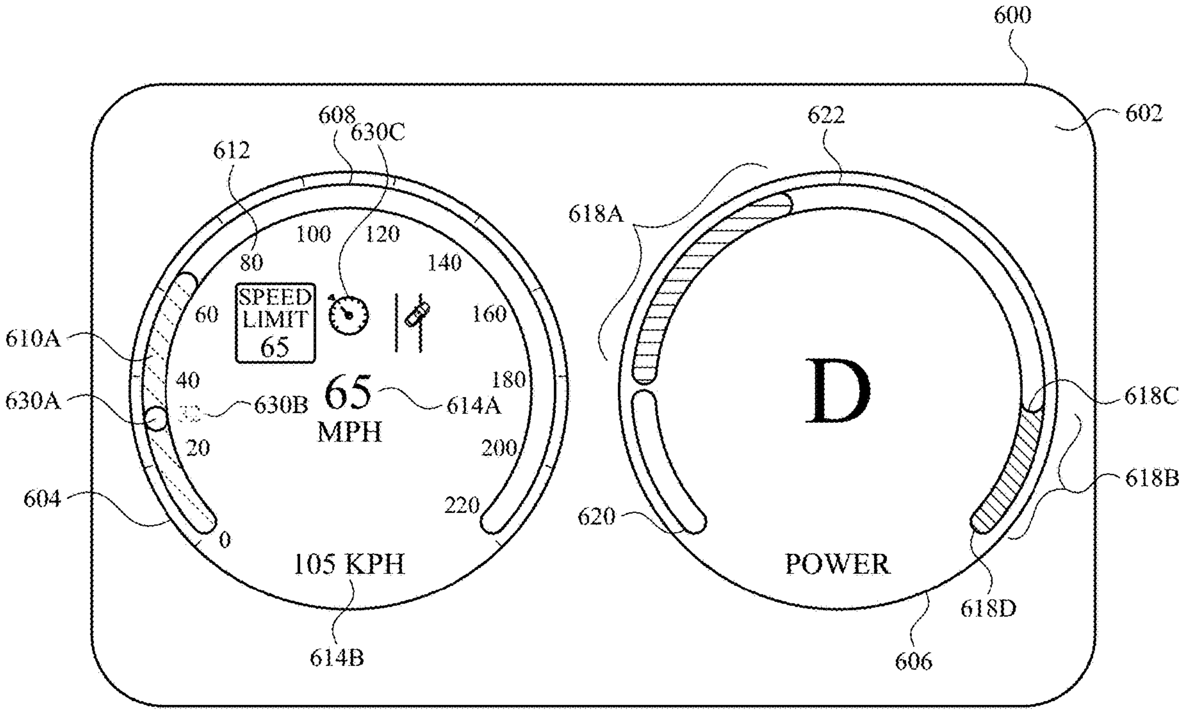

At FIG. 6B, in response to detecting the request to activate cruise control, computer system 600 activates cruise control, thereby causing display of cruise control indicator 630A and textual cruise control speed 630B. Because cruise control is not engaged, cruise control indicator 630A and textual cruise control speed 630B are displayed with appearances that indicate that cruise control is not engaged (e.g., light color, gray color, and/or smaller in size). The location of cruise control indicator 630A along path 608 indicates the cruise control speed. Similarly, textual cruise control speed 630B indicates cruise control speed via alphanumeric text and, separately, via the display location of textual cruise control speed 630B along path 608. In some embodiments, cruise control indicator 630A and textual cruise control speed 630B continue to be displayed (e.g., as part of the speedometer) while cruise control is activated and not engaged (e.g., the display of cruise control indicator 630A and textual cruise control speed 630B does not time out). At FIG. 6B, further in response to detecting the request to activate cruise control, computer system 600 displays indication 630C. In some embodiment, indication 630C is displayed when cruise control is active (regardless of whether cruise control is engaged or not engaged) to indicate to the user that cruise control is active. In contrast to cruise control indicator 630A and textual cruise control speed 630B, the location of indication 630C does not indicate the cruise control speed.

At FIG. 6B, cruise control indicator 630A and textual cruise control speed 630B are displayed at locations along path 608 that correspond to 32 mph, indicating that the vehicle will adjust to a speed of 32 mph if cruise control is engaged. Similarly, textual cruise control speed 630B specifies "32", indicating that the vehicle will adjust to a speed of 32 mph if cruise control is engaged. At FIG. 6B, the speed of the vehicle has increased to 65 mph, as indicated by the filled first portion 610A extending to a location along path 608 that corresponds to 65 mph, numeric mph speed indicator 614A, and numeric kph speed indicator 614B.

At FIG. 6B, fill 618A has increased in size to reach a level that corresponds to the amount of power currently being used, which is more than in FIG. 6A. Fill 618B has reduced in size, indicating that more power is available for acceleration (e.g., max available power is higher and continues to be indicated by end 618C). At FIG. 6B, computer system 600 receives user input requesting to increase the cruise control speed. For example, the input is on a scroll wheel of a steering wheel of the vehicle, is a gesture (e.g., a hand gesture, a facial gesture, and/or an air gesture), and/or is a voice command.

Figure 6C:
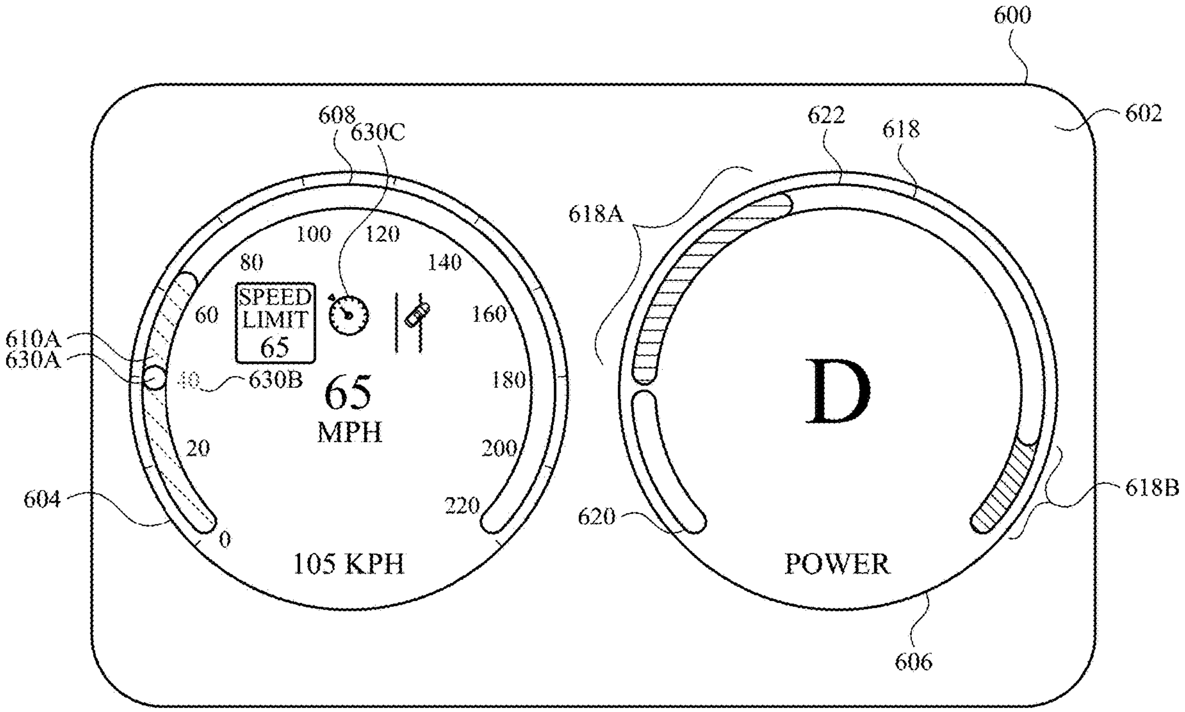

At FIG. 6C, in response to receiving the input requesting to increase the cruise control speed, computer system 600 increases the cruise control speed and updates display of cruise control indicator 630A and textual cruise control speed 630B. In particular, cruise control indicator 630A and textual cruise control speed 630B move together along path 608 to locations corresponding to the increased cruise control speed of 40. Textual cruise control speed 630B is updated to "40" to reflect the increased cruise control speed. Because cruise control is not engaged, cruise control indicator 630A and textual cruise control speed 630B continue to be displayed with appearances that indicate that cruise control is not engaged (e.g., light color, gray color, and/or smaller in size).

At FIG. 6C, the battery of the vehicle continues to warm up, thereby enabling a higher maximum power output. As a result, fill 618B of power gauge 606 continues to reduce in size. At FIG. 6C, computer system 600 again receives user input requesting to increase the cruise control speed. For example, the input is on a scroll wheel of a steering wheel of the vehicle, is a gesture (e.g., a hand gesture, a facial gesture, and/or an air gesture), and/or is a voice command.

Figure 6D:
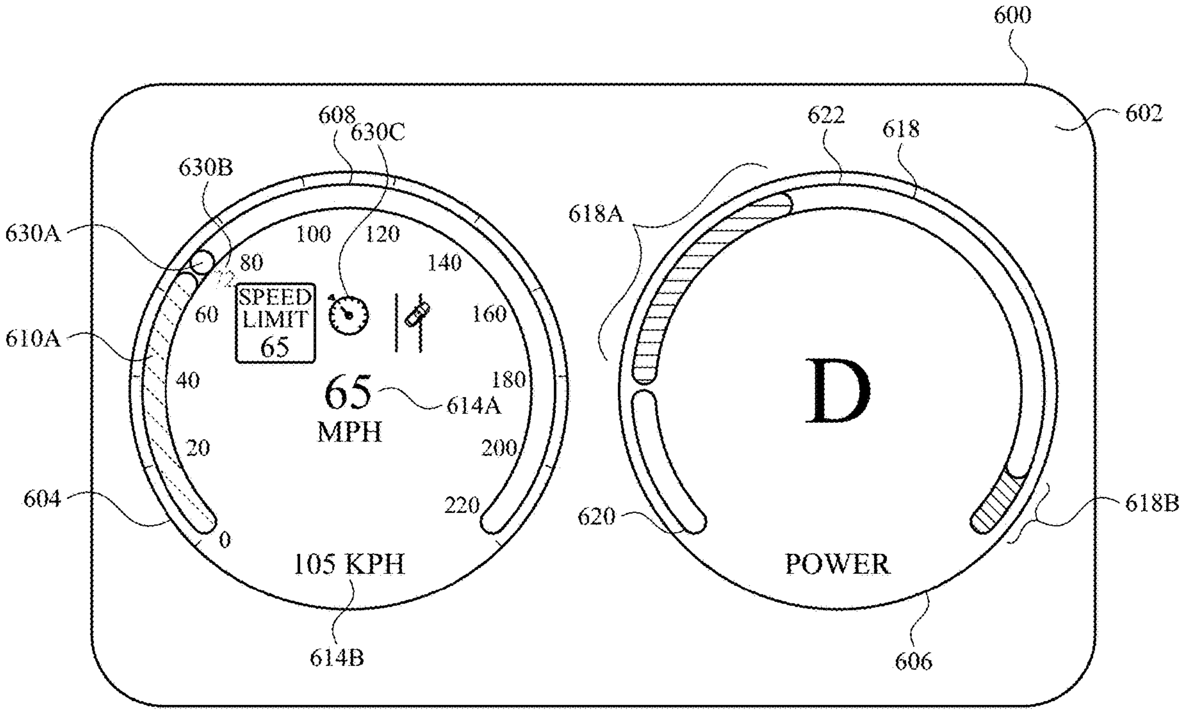

At FIG. 6D, in response to receiving the input requesting to increase the cruise control speed, computer system 600 increases the cruise control speed and updates display of cruise control indicator 630A and textual cruise control speed 630B. In particular, cruise control indicator 630A and textual cruise control speed 630B move together (e.g., in unison or along the same path at similar speeds) along path 608 to locations corresponding to the increased cruise control speed of 72 mph. Textual cruise control speed 630B is updated to "72" to reflect the increased cruise control speed. Because cruise control is not engaged, cruise control indicator 630A and textual cruise control speed 630B continue to be displayed with appearances that indicate that cruise control is not engaged (e.g., light color, gray color, and/or smaller in size). At FIG. 6D, the battery of the vehicle continues to warm up, thereby enabling a higher maximum power output. As a result, fill 618B of power gauge 606 continues to reduce in size.

At FIG. 6D, computer system 600 receives user input requesting to engage cruise control. For example, the input is on a button of a steering wheel of the vehicle, is a gesture (e.g., a hand gesture, a facial gesture, and/or an air gesture), and/or is a voice command.

Figure 6E:
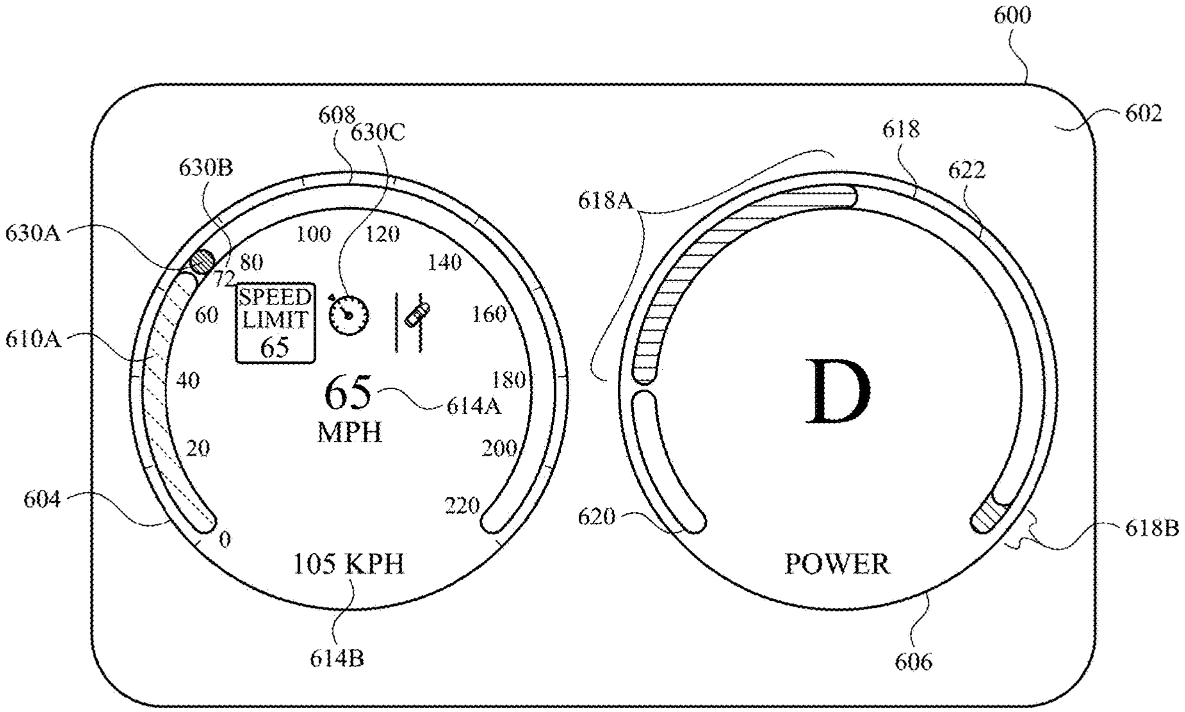

At FIG. 6E, in response to receiving the user input requesting to engage cruise control, computer system 600 engages cruise control and updates display of cruise control indicator 630A and textual cruise control speed 630B. Cruise control indicator 630A and textual cruise control speed 630B continue to be displayed at locations corresponding to the cruise control speed of 72 mph. Because cruise control is engaged, computer system 600 has changed an appearance of cruise control indicator 630A (e.g., darker color, such as green, different size, and/or different shape) and has changed an appearance of textual cruise control speed 630B (e.g., darker color and/or larger in size) to indicate that cruise control is engaged. As the vehicle is applying more power to increase speed from 65 mph to 72 mph, power gauge 606 indicates the increased power usage. At FIG. 6D, the battery of the vehicle continues to warm up, thereby enabling a higher maximum power output. As a result, fill 618B of power gauge 606 continues to reduce in size.

Figure 6F:
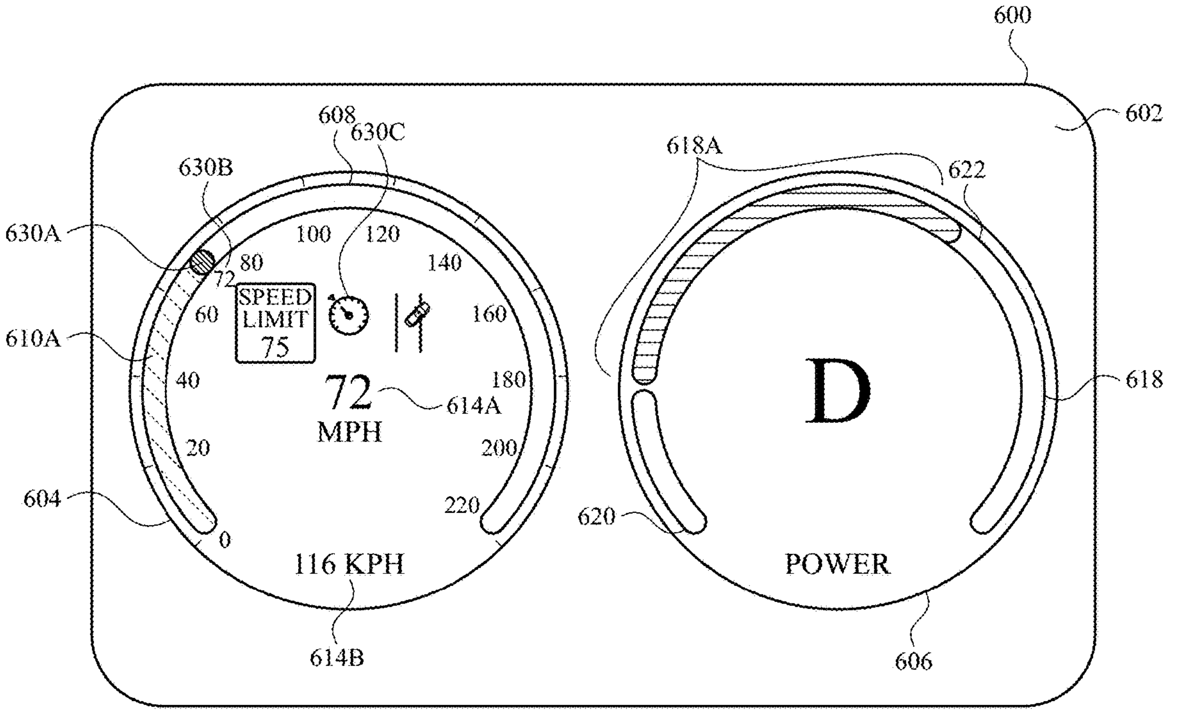

At FIG. 6F, with the cruise control being engaged, the vehicle speed has reached the cruise control speed of 72 mph. Cruise control indicator 630A and textual cruise control speed 630B continue to be displayed at locations corresponding to the cruise control speed of 72 mph. At FIG. 6F, the battery of the vehicle has finished warming up, thereby enabling the maximum power output. As a result, fill 618B is no longer displayed as part of power gauge 606.

Figure 6G:
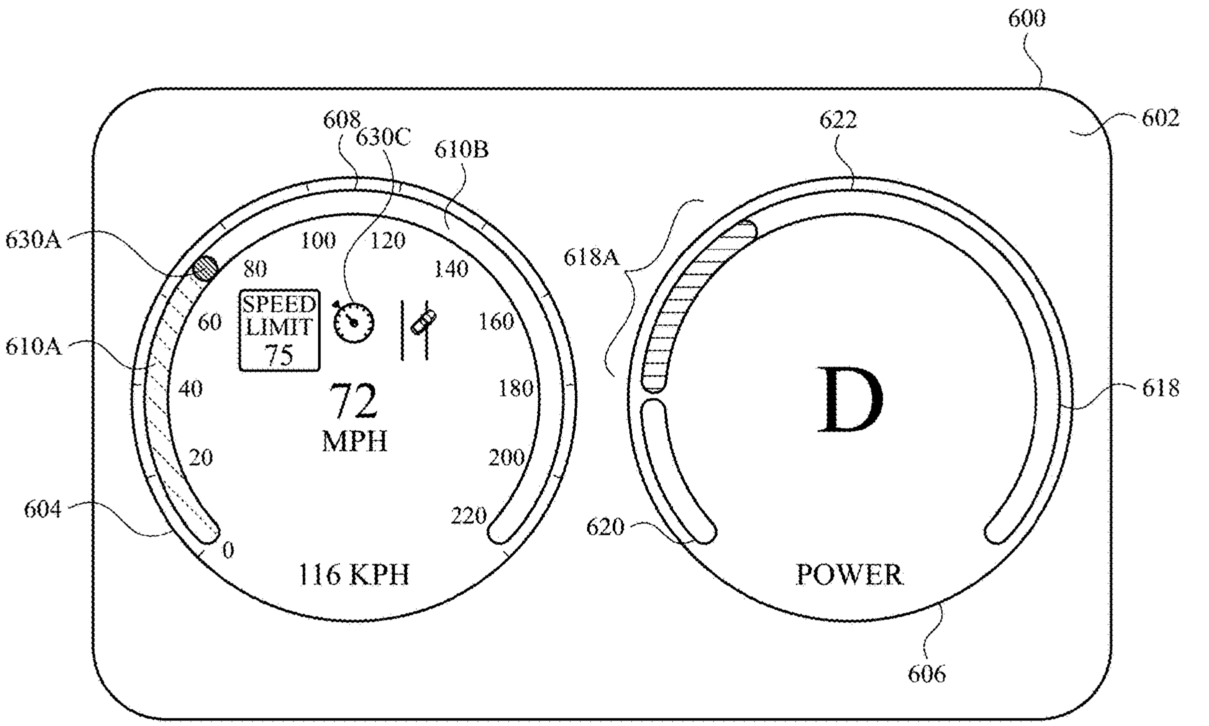

At FIG. 6G, computer system 600 has ceased to display textual cruise control speed 630B a predetermined amount of time (e.g., 1 second, 3 seconds, or 5 seconds) after cruise control was engaged, while continuing to display cruise control indicator 630A. In some embodiments, computer system 600 ceases to display textual cruise control speed 630B a predetermined amount of time (e.g., 1 second, 3 seconds, or 5 seconds) after the vehicle speed reaches the cruise control speed (rather than after cruise control is engaged), while continuing to display cruise control indicator 630A. By ceasing to display textual cruise control speed 630B, computer system 600 declutters display 602 and, in particular, speedometer gauge 604. By continuing to display cruise control indicator 630A, computer system 600 continues to provide feedback to the user about the cruise control speed. At FIG. 6G, the computer system 600 detects an input (e.g., activation of a brake pedal) to disengage cruise control.

Figure 6H:
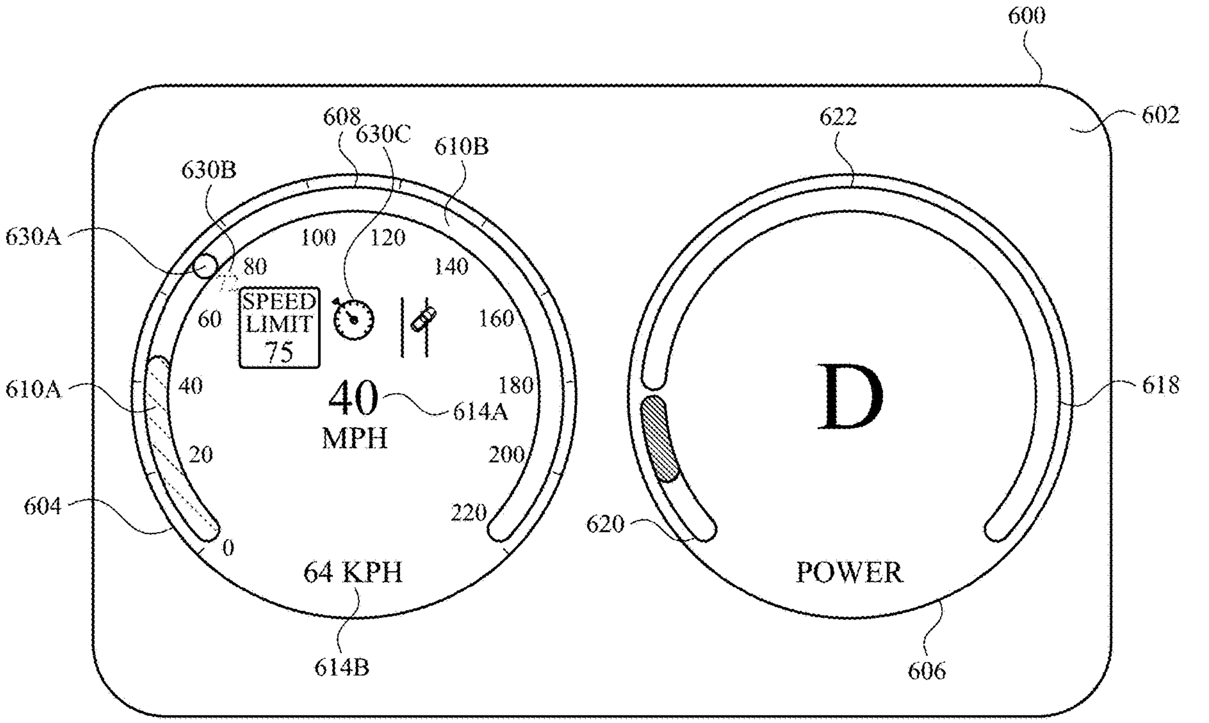

As illustrated in FIG. 6H, in response to the user activating a brake pedal of the vehicle, cruise control disengages and the vehicle has slowed down to 40 mph, as indicated by first portion 610A of path 608 and numeric mph speed indicator 614A. Because cruise control becomes disengaged (while staying activated), textual cruise control speed 630B is newly displayed and cruise control indicator 630A continues to be displayed, both with appearances that indicate that cruise control is not engaged (e.g., light color, gray color, and/or smaller in size) and both at locations corresponding to the cruise control speed of 72 mph along path 608. If the computer system were to receive user input to engage cruise control, the appearances of cruise control indicator 630A and textual cruise control speed 630B would change to indicate that cruise control is engaged (as shown in FIG. 6E), the speed of the vehicle would increase again to 72 mph (as shown in FIG. 6F), and the textual cruise control speed 630B would cease to be displayed after the predetermined amount of time (as shown in FIG. 6G).

Thus, when cruise control is not activated, cruise control indicator 630A and textual cruise control speed 630B are not displayed. When cruise control is activated and not engaged, cruise control indicator 630A and textual cruise control speed 630B are persistently displayed. When cruise control is activated and engaged, cruise control indicator 630A is persistently displayed and textual cruise control speed 630B is displayed for a predetermined amount of time before ceasing to be displayed.

At FIG. 6H, since the car is slowing down and power is being generated using regenerative braking, power gauge 606 indicates that power is being produced by filling a part of first portion 620 of path 618. The amount of first portion 620 filled in corresponds to the amount of power being produced and/or stored. At FIG. 6H, computer system 600 receives user input requesting to decrease the cruise control speed. For example, the input is on a scroll wheel of a steering wheel of the vehicle, is a gesture (e.g., a hand gesture, a facial gesture, and/or an air gesture), and/or is a voice command.

Figure 6I:
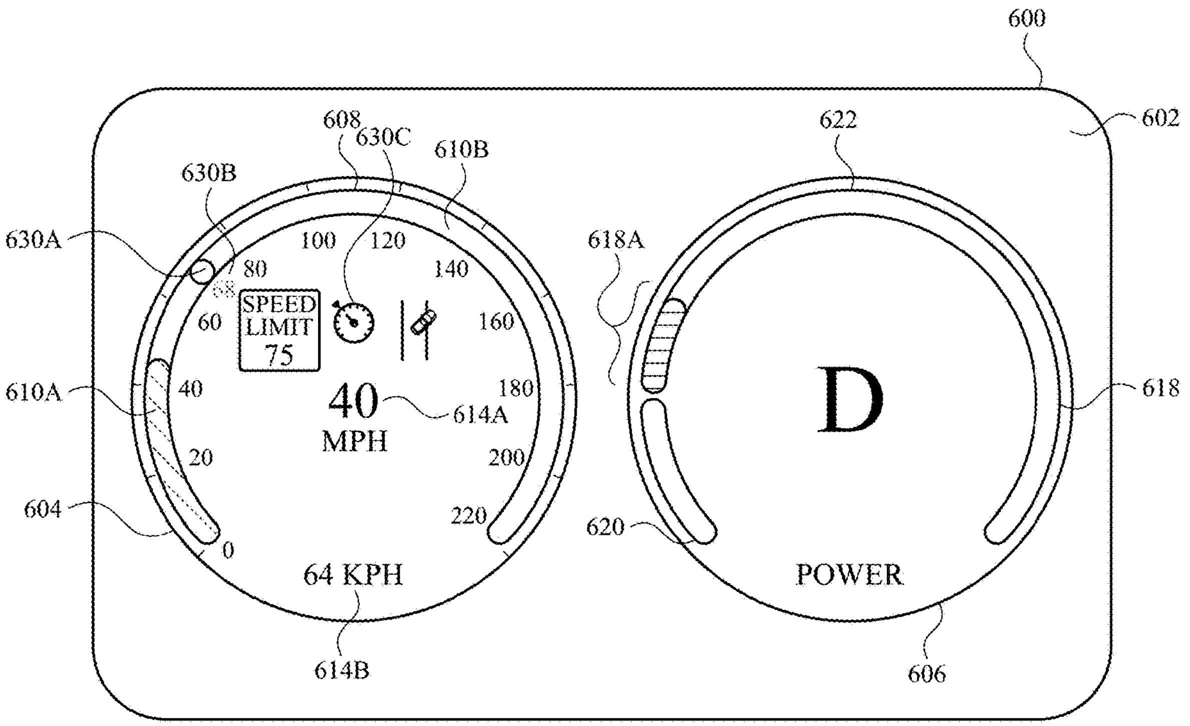

At FIG. 6I, in response to receiving the input requesting to decrease the cruise control speed, computer system 600 decreases the cruise control speed and updates display of cruise control indicator 630A and textual cruise control speed 630B. In particular, cruise control indicator 630A and textual cruise control speed 630B move together along path 608 to locations corresponding to the decreased cruise control speed of 68 mph. Textual cruise control speed 630B is updated to "68" to reflect the increased cruise control speed. Because cruise control is not engaged, cruise control indicator 630A and textual cruise control speed 630B continue to be displayed (without timing out) with appearances that indicate that cruise control is not engaged (e.g., light color, gray color, and/or smaller in size). At FIG. 6I, computer system 600 receives user input requesting to engage cruise control. For example, the input is on a button of a steering wheel of the vehicle, is a gesture (e.g., a hand gesture, a facial gesture, and/or an air gesture), and/or is a voice command.

Figure 6J:
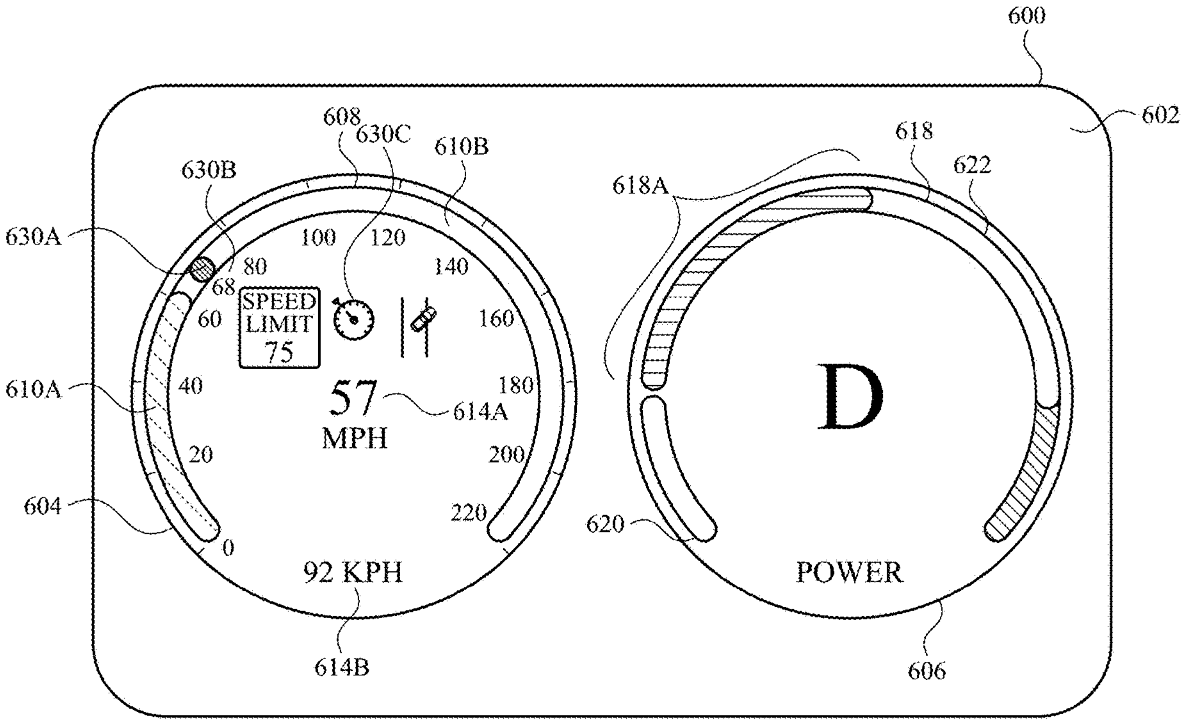

At FIG. 6J, in response to receiving the user input requesting to engage cruise control, computer system 600 engages cruise control and updates display of cruise control indicator 630A and textual cruise control speed 630B. In particular, cruise control indicator 630A and textual cruise control speed 630B continue to be displayed at locations corresponding to the cruise control speed of 72 mph. Because cruise control is engaged, cruise control indicator 630A has changed appearance (e.g., darker color, such as green, different size, and/or different shape) and textual cruise control speed 630B has changed appearance (e.g., darker color and/or larger in size) to indicate that cruise control is engaged. As the vehicle is applying more power to increase speed from 40 mph to 68 mph, power gauge 606 indicates the increased power usage. At FIG. 6J, computer system 600 has determined that the power usage should not exceed a threshold amount in order for the battery to support the vehicle arriving at a requested destination. Accordingly, the maximum power has been limited, as indicated by fill 618B and end 618C of second portion 622 of path 618, as shown in FIGS. 6J and 6K.

Figure 6K:
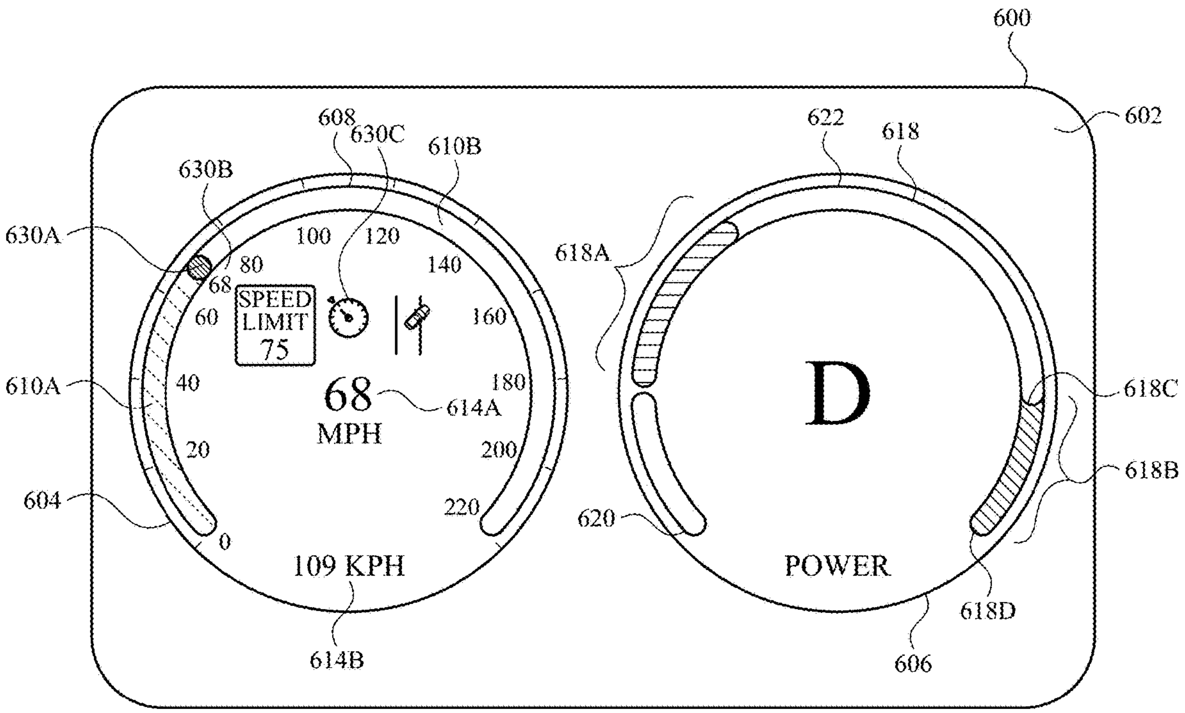

At FIG. 6K, with cruise control being engaged, the vehicle speed has reached the cruise control speed of 68 mph. Computer system 600 continues to display cruise control indicator 630A at the location corresponding to the cruise control speed of 68 mph and computer system 600 has ceased to display textual cruise control speed 630B because the predetermined amount of time (e.g., 1 second, 3 seconds, or 5 seconds) has passed since cruise control was engaged. In other words, cruise control indicator 630A continues to be displayed without timing out and textual cruise control speed 630B is displayed for a limited duration once cruise control is engaged. At FIG. 6K, computer system 600 receives user input requesting to enter a map mode. In some embodiments, the computer system is navigating to a destination and the request to enter a map mode is a request to display navigation instructions to the destination.

Figure 6L:
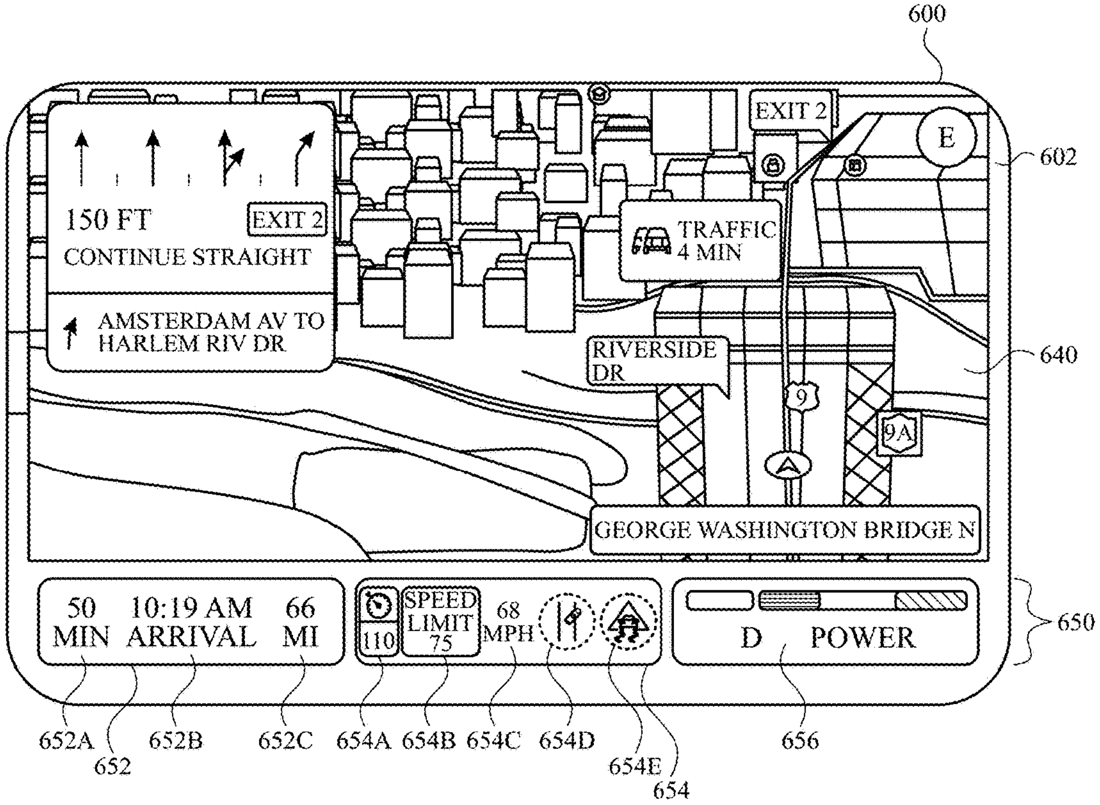

At FIG. 6L, in response to receiving the user input requesting to enter the map mode, computer system 600 concurrently displays reduced size instrument cluster 650 and map 640. Map 640 has replaced display of speedometer gauge 604 and power gauge 606 on display 602 (e.g., map 640 is now displayed at the locations where speedometer gauge 604 and power gauge 606 were previously displayed). In response to receiving the user input requesting to enter the map mode, computer system 600 ceases to display speedometer gauge 604, and instead displays reduced size instrument cluster 650.

Reduced size instrument cluster 650 includes three sections 652-656. Section 652 includes navigation information, including duration 652A until arrival, arrival time 652B, and distance 652C to destination. Section 654 includes indication 654A of cruise control speed (that does not indicate speed based on display location), speed limit indicator 654B (which provides an indication of the speed limit for the current location (e.g., street or freeway)), current vehicle speed 654C (with does not indicate speed based on display location or size), lane guidance indicator 654D (which indicates that the driving lane is being monitored and the user will be notified (e.g., visual, audio, and/or tactile warnings)), and indication 654E that stability control is enabled. Section 656 includes power gauge 656A (which includes a straight path consisting of a first portion and a second portion, where the path is used to indicate an amount of power, similar to power gauge 606). As a result, a user of computer system 600 can quickly and easily access the navigation map while still having access to the instrument cluster of the vehicle.

FIG. 7 is a flow diagram illustrating methods of managing cruise control settings, in accordance with some embodiments. Method 700 is performed at a computer system (e.g., 100, 300, 500, and/or 600) (e.g., a smartphone, a wearable (e.g., head-mounted) device, and/or a computer system of a vehicle (e.g., an automobile, a boat, or an airplane)), wherein the computer system is in communication with one or more display generation components (e.g., one or more display generation components of the vehicle, one or more displays set within a front console of the vehicle, one or more displays positioned ahead of/in front of a driver's seat of the vehicle, one or more heads-up displays, one or more display drivers, and/or one or more displays of a wearable device) and one or more input devices (a touch-sensitive surface, an input device (e.g., scroll wheel, a button, and/or a touch-sensitive surface) integrated into a steering wheel of the vehicle, one or more cameras (e.g., for detecting gestures performed in the air), and/or a microphone). In some embodiments, the computer system is in communication with a vehicle (e.g., an automobile, a boat, or an airplane) (e.g., is integrated into the vehicle, is in wired communication with the vehicle, and/or is in wireless communication with the vehicle). Some operations in method 700 are, optionally, combined, the orders of some operations are, optionally, changed, and some operations are, optionally, omitted.

As described below, method 700 provides an intuitive way for managing cruise control settings. The method reduces the cognitive burden on a user for managing cruise control settings, thereby creating a more efficient human-machine interface. For battery-operated computing devices, enabling a user to manage cruise control settings faster and more efficiently conserves power and increases the time between battery charges.

The computer system (e.g., 600) concurrently displays (702), via the one or more display generation components (e.g., 602) and as part of an instrument cluster (e.g., of the vehicle and/or for the vehicle): a cruise control (e.g., adaptive cruise control or non-adaptive cruise control) indicator (e.g., 630A) (e.g., a dot or non-dot indicator) at a location (e.g., along a path of a speedometer and/or along a path corresponding to speed) that corresponds to a cruise control speed (e.g., 65 mph or 75 mph, a set cruise control speed, or a cruise control speed that is not set), and a textual (numeric, alphabetic, and/or alphanumeric) indication (e.g., 630B) of the cruise control speed.

While concurrently displaying the cruise control indicator and the textual indication of the cruise control speed, the computer system (e.g., 600) receives (704), via the one or more input devices, a first input (e.g., a confirmation input to set a desired cruise control speed, an input to engage cruise control, and/or an input to resume cruise control).

In response to receiving the first input, the computer system (e.g., 600) ceases (710) to display, via the one or more display generation components, the textual indication (e.g., 630B) of the cruise control speed after a non-zero duration (e.g., 1 second, 3 seconds, or 5 seconds) while continuing to display, via the one or more display generation components, the cruise control indicator (e.g., 630A) at the location that corresponds to the cruise control speed (without ceasing to display the cruise control indicator at the location that corresponds to the cruise control speed after the non-zero duration). Ceasing to display a textual indication of cruise control speed while continuing to display a cruise control indicator at a location that corresponds to the cruise control speed provides the user with visual feedback about the cruise control speed without cluttering the user interface, thereby providing improved visual feedback.

In accordance with some embodiments, the computer system (e.g., 600) is integrated into a vehicle. In some embodiments, the one or more display generation components are integrated into the vehicle. A computer system integrated into the vehicle provides the user with real-time feedback about the operation of the vehicle, thereby providing improved feedback.

In accordance with some embodiments, displaying, as part of the instrument cluster, the cruise control indicator (e.g., 630A) at the location that corresponds to the cruise control speed includes: in accordance with a determination that a cruise control system of a vehicle is engaged (e.g., cruise control is active and the vehicle is controlling the speed of the vehicle based on the set cruise control speed), the cruise control indicator (e.g., 630A at FIG. 6E) has a first appearance (e.g., a first color (e.g., white or green), a first size, and/or a first shape (independent of the display location of the cruise control indicator)); and in accordance with a determination that a cruise control system of the vehicle is not engaged (e.g., cruise control is active and the vehicle is not controlling the speed of the vehicle based on the set cruise control speed, such as based on detecting activation of a brake or accelerator pedal of the vehicle, detecting that the vehicle has come to a stop for more than a (zero or non-zero) predetermined duration, and/or receiving other input), the cruise control indicator (e.g., 630A at FIG. 6D) has a second appearance (e.g., a second color (e.g., gray or black), a second size, and/or a second shape (independent of the display location of the cruise control indicator)) that is different from the first appearance. Displaying the cruise control indicator with a different appearance when cruise control is engaged vs not engaged provides the user with visual feedback about the status of the vehicle's cruise control system (e.g., engaged or not engaged), thereby providing improved visual feedback.

In accordance with some embodiments, displaying, as part of the instrument cluster, the textual indication (e.g., 630B) of the cruise control speed includes: in accordance with a determination that a cruise control system of a vehicle is engaged (e.g., cruise control is active and the vehicle is controlling the speed of the vehicle based on the set cruise control speed), the textual indication (e.g., 630B at FIG. 6E) of the cruise control speed has a third appearance (e.g., a third color (e.g., white or green), a third size, and/or a third font); and in accordance with a determination that the cruise control system of the vehicle is not engaged (e.g., cruise control is active and the vehicle is not controlling the speed of the vehicle based on the set cruise control speed, such as based on detecting activation of a brake or accelerator pedal of the vehicle, detecting that the vehicle has come to a stop for more than a (zero or non-zero) predetermined duration, and/or receiving other input), the textual indication (e.g., 630B at FIG. 6F) of the cruise control speed has a fourth appearance (e.g., a fourth color (e.g., gray or black), a fourth size, and/or a fourth font) that is different from the third appearance. Displaying the textual indication of the cruise control speed with a different appearance when cruise control is engaged vs not engaged provides the user with visual feedback about the status of the vehicle's cruise control system (e.g., engaged or not engaged), thereby providing improved visual feedback.

In accordance with some embodiments, the computer system (e.g., 600) displays, via the one or more display generation components and as part of the instrument cluster, a speed indicator (e.g., 610A) (e.g., a bar that expands to fill a path, a needle with a tip that follows a path) that moves (in conjunction with a change in detected speed of the vehicle) along a path (e.g., 608) corresponding to speed to indicate a current speed of a vehicle. In some embodiments, different portions of the path correspond to different speeds. In some embodiments, the cruise control indicator (e.g., 630A) is displayed at a location along (e.g., on, next to, and/or adjacent to) the path (e.g., 608) corresponding to speed (e.g., while continuing to display the speed indicator at a location along the path corresponding to speed). In some embodiments, the path is linear and/or straight. In some embodiments, the path is curved. In some embodiments, the path is an arc. In some embodiments, the displayed location of the cruise control indicator along the path is based on (e.g., indicates) the cruise control speed. Displaying the cruise control indicator at locations along a path that corresponds to speed enables the computer system to provide the user with visual feedback about how cruise control will affect the speed of the vehicle, thereby providing improved visual feedback.

In accordance with some embodiments, the speed indicator (e.g., 610A) fills in a region corresponding to the path (e.g., 608) and the filled region indicates the current speed of a vehicle. Filling in a region to corresponding to the path provides the user with visual feedback about the speed of the vehicle, thereby providing improved visual feedback.

In accordance with some embodiments, the textual (numeric, alphabetic, and/or alphanumeric) indication (e.g., 630B) of the cruise control speed is displayed at a location (e.g., along (e.g., on, next to, and/or adjacent to) the path (e.g., 608) corresponding to speed) corresponding to the cruise control speed. Displaying the textual indication of the cruise control speed at a location that reflects the cruise control speed provides the user with visual feedback about the cruise control speed that is based on location, rather than content, thereby providing improved visual feedback.

In accordance with some embodiments, the computer system (e.g., 600) displays, via the one or more display generation components (e.g., 602) and as part of the instrument cluster, a speed indicator (e.g., 610A) (e.g., a bar that expands to fill a path, a needle with a tip that follows a path) that moves along a path (e.g., 608) corresponding to speed to indicate a current speed of a vehicle. In some embodiments, different portions of the path correspond to different speeds. The computer system (e.g., 600) receives, via the one or more input devices, input to change the cruise control speed. In response to receiving the input to change the cruise control speed (e.g., while cruise control is active and engaged or not engaged), the computer system (e.g., 600) moves (e.g., translating, sliding, and/or animating) the cruise control indicator (e.g., 630A) along (e.g., on, next to, and/or adjacent to) at least a portion of the path (e.g., 608) corresponding to speed (e.g., while continuing to display the speed indicator at a location along the path corresponding to speed). In some embodiments, the path is linear and/or straight. In some embodiments, the path is curved. In some embodiments, the path is an arc. Moving the cruise control indicator along a path corresponding to speed provides the user with visual feedback about the cruise control speed that will be set, thereby providing the user with improved visual feedback.

In accordance with some embodiments, in response to receiving the input to change the cruise control speed (e.g., while cruise control is active and engaged or not engaged), the computer system (e.g., 600) moves (e.g., translating, sliding, and/or animating) (e.g., in conjunction with the input to change the cruise control speed), in conjunction with the cruise control indicator (e.g., 630A), the textual (numeric, alphabetic, and/or alphanumeric) indication (e.g., 630B) of the cruise control speed along (e.g., on, next to, and/or adjacent to) at least the portion of the path (e.g., 608) corresponding to speed (e.g., while continuing to display the speed indicator at a location along the path corresponding to speed). In some embodiments, the path is linear and/or straight. In some embodiments, the path is curved. In some embodiments, the path is an arc. Displaying and moving the textual indication of cruise control speed along a path corresponding to speed provides the user with visual feedback about the cruise control speed that will be set, thereby providing the user with improved visual feedback.

In accordance with some embodiments, while displaying a speedometer gauge (e.g., 604) with a first size that includes the speed indicator (e.g., 610A) (e.g., a bar that expands to fill a path, a needle with a tip that follows a path) that moves (in conjunction with a change in detected speed of the vehicle) along the path (e.g., 608) corresponding to speed to indicate the current speed of a vehicle and that includes the cruise control indicator (e.g., 630A) that corresponds to the cruise control speed (and, optionally, the textual indication of the cruise control speed), the computer system (e.g., 600) receives, via the one or more input devices, a second input (e.g., an input initiating navigation to a destination, an input requesting display of a user interface of an application (e.g., a map of a navigation application or a music user interface of an audio application), and/or an input requesting to reduce the display size of the instrument cluster). In response to receiving the second input, the computer system displays, via the one or more display generation components (e.g., 602) and without displaying the speedometer gauge (e.g., 604): a second speed indicator (e.g., 654C) (e.g., a numeric indication of speed at a location that does not correspond to speed) (e.g., that was not displayed when the second input was received) that is a second size that is smaller than the first size, and a second cruise control indicator (e.g., 654A) that indicates the cruise control speed independent of a display location of the second cruise control indicator (the location of the second cruise control indicator is independent of the cruise control speed). Reducing the size of the instrument cluster, such as by reducing the size of the speed indicator and/or cruise control indicator, enables the computer system to provide visual feedback to the user about other relevant content, thereby improving the man-machine interface and providing improved visual feedback.

In accordance with some embodiments, the second speed indicator (e.g., 654C) indicates a speed of a vehicle without moving along a path corresponding to speed and/or the second cruise control indicator (e.g., 654A) indicates the cruise control speed without moving along a path corresponding to speed. Not having a path along which the second speed indicator and/or second cruise control indicator moves reduces the amount of space required to display the content, which enables the computer system to provide visual feedback to the user about other relevant content, thereby improving the man-machine interface and providing improved visual feedback.

In accordance with some embodiments, the speedometer gauge (e.g., 604) is displayed at a first location. In response to receiving the second input, the computer system (e.g., 600) displays, via the one or more display generation components (e.g., 602) and at the first location, a map user interface (e.g., 640) (e.g., of a map application) that replaces display of the speedometer gauge (e.g., 604). Replacing displaying of the speedometer with the map user interface enables the computer system to provide the user with feedback about the location of vehicle in a map, thereby providing the user with improved visual feedback.

In accordance with some embodiments, the computer system (e.g., 600) displays at a second location, via the one or more display generation components (e.g., 602) and concurrently with the speedometer gauge (e.g., 604), a power gauge (e.g., 606) that indicates an amount of power (e.g., being used by the vehicle or being generated by the vehicle). In response to receiving the second input, the computer system (e.g., 600) displays, via the one or more display generation components (e.g., 602) and at the second location, a map user interface (e.g., 640) (e.g., of a map application) that replaces display of the power gauge (e.g., 606). In some embodiments, the map user interface replaces both the speedometer gauge and the power gauge. Replacing displaying of the power gauge with the map user interface enables the computer system to provide the user with feedback about the location of vehicle in a map, thereby providing the user with improved visual feedback.

In accordance with some embodiments, in response to receiving the second input, the computer system (e.g., 600) displays, via the one or more display generation components (e.g., 602) (and, optionally, concurrently with the map user interface): a first indication (e.g., 654A, 654D, or 654E) corresponding to a first setting (e.g., whether cruise control is set and/or engaged, a cruise control setting, whether lane guidance is enabled/disabled, and/or whether stability control is enabled/disabled) of a vehicle, and a second indication (e.g., 654A, 654D, or 654E) corresponding to a second setting (e.g., whether cruise control is set and/or engaged, a cruise control setting, whether lane guidance is enabled/disabled, and/or whether stability control is enabled/disabled) of the vehicle that is different from the first setting. In some embodiments, the first indication and the second indication are not overlaid on the map user interface. In some embodiments, the first indication and the second indication are displayed below the map user interface. In some embodiments, the first indication and the second indication are telltale indications of the vehicle status, such as indicating important aspects of the vehicle's status. Displaying indications of the status of the vehicle provides the user with visual feedback about the state of the vehicle, thereby providing improved visual feedback.

In accordance with some embodiments, the computer system (e.g., 600) displays, via the one or more display generation components (e.g., 602) and concurrently with the cruise control (e.g., adaptive cruise control or non-adaptive cruise control) indicator (e.g., 630A) (e.g., a dot or non-dot indicator) and the textual (numeric, alphabetic, and/or alphanumeric) indication (e.g., 630B) of the cruise control speed, a power gauge (e.g., 606) that includes a path (e.g., 618) with a first portion (e.g., 620) and a second portion (e.g., 622), wherein the first portion (e.g., 620) corresponds to amounts of power a vehicle is producing and/or storing based on travel (e.g., using regenerative braking and/or wind energy production) and the second portion (e.g., 622) corresponds to amount of power that the vehicle is using based on travel (e.g., to propel the vehicle and/or to run the electronics of the vehicle). Displaying a power meter that has different portions for power produced vs power used enables the computer system to provide the user with visual feedback about the power state of the vehicle, thereby proving the user with improved visual feedback.

In accordance with some embodiments, the first portion (e.g., 620) fills with a first appearance (e.g., a third color, such as green) and the second portion (e.g., 622) fills with a second appearance (e.g., a fourth color, such as white or blue, that is different from the third color). Filling different portions of the power gauge path with different colors provides feedback to the user about which portion of the power gauge path is being filled, thereby providing the user with improved visual feedback.

In accordance with some embodiments, the second portion (e.g., 622) of the path (e.g., 618) of the power gauge includes an indication (e.g., 618B) of currently available maximum power (e.g., based on the ability of the batteries of the vehicle to output the power and/or based on limits placed by the vehicle to facilitate the vehicle arriving at a planned destination with limited battery power). In some embodiments, the indication of currently available maximum power has a fifth color that is different from the third and fourth colors. Indicating an amount of available maximum power along the path of the power gauge provides the user with visual feedback about the amount of power available, thereby providing improved visual feedback.

In accordance with some embodiments, the indication (e.g., 618B) of currently available maximum power changes (e.g., moves, resizes, and/or otherwise updates) as the currently available maximum power changes over time. Updating the indicated amount of available maximum power as the currently available maximum power changes provides the user with feedback about the available maximum power at any time, thereby providing improved visual feedback.

In some embodiments, currently available maximum power changes over time based on a temperature of one or more batteries (e.g., used to propel the vehicle) of a vehicle, an ambient temperature, and/or reduced power to facilitate the vehicle reaching a planned destination with limited battery. Determining the amount of currently available maximum power based on temperature of batteries, ambient temperature, and/or reduced power to achieve a longer travel distance provides the user with visual feedback about how the power performance of the battery is being affected, thereby providing improved visual feedback.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve cruise control settings. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, or any other identifying or personal information.

The present disclosure recognizes that the use of such personal information data, in the present technology, can be used to the benefit of users. For example, the personal information data can be used to set cruise control based on personal preferences. Accordingly, use of such personal information data enables users to have calculated control of the cruise control settings. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized cruise control settings, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, cruise control settings can still be managed based on non-personal information data or a bare minimum amount of personal information, such as the content being requested by the device associated with a user, other non-personal information available to the system, or publicly available information.

What is claimed is:

1. A computer system configured to communicate with one or more display generation components and one or more input devices, comprising:

- one or more processors; and
- memory storing one or more programs configured to be executed by the one or more processors, the one or more programs including instructions for:
  - concurrently displaying, via the one or more display generation components and as part of an instrument cluster:
    - a cruise control indicator at a location that corresponds to a cruise control speed, and
    - a textual indication of the cruise control speed; and
    - a speed indicator that moves along a path corresponding to speed to indicate a current speed of a vehicle;
  - receiving, via the one or more input devices, input to change the cruise control speed; and
    - in response to receiving the input to change the cruise control speed:
      - moving the cruise control indicator along at least a portion of the path corresponding to speed; and
      - moving, in conjunction with the cruise control indicator, the textual indication of the cruise control speed along at least the portion of the path corresponding to speed.

2. The computer system of claim 1, wherein the computer system is integrated into a vehicle.

3. The computer system of claim 1, wherein displaying, as part of the instrument cluster, the cruise control indicator at the location that corresponds to the cruise control speed includes:

- in accordance with a determination that a cruise control system of a vehicle is engaged, the cruise control indicator has a first appearance; and
- in accordance with a determination that a cruise control system of the vehicle is not engaged, the cruise control indicator has a second appearance that is different from the first appearance.

4. The computer system of claim 1, wherein displaying, as part of the instrument cluster, the textual indication of the cruise control speed includes:

- in accordance with a determination that a cruise control system of a vehicle is engaged, the textual indication of the cruise control speed has a third appearance; and
- in accordance with a determination that the cruise control system of the vehicle is not engaged, the textual indication of the cruise control speed has a fourth appearance that is different from the third appearance.

5. The computer system of claim 1, wherein the cruise control indicator is displayed at a location along the path corresponding to speed.

6. The computer system of claim 1, wherein the speed indicator fills in a region corresponding to the path and the filled region indicates the current speed of a vehicle.

7. The computer system of claim 1, wherein the textual indication of the cruise control speed is displayed at a location corresponding to the cruise control speed.

8. The computer system of claim 1, wherein the path is visually displayed.

9. The computer system of claim 1, wherein the cruise control indicator and the textual indication of the cruise control speed are distinct.

10. The computer system of claim 1, wherein:

- moving the cruise control indicator along at least a portion of the path corresponding to speed includes translating, sliding, and/or animating the cruise control indicator along at least a portion of the path corresponding to speed; and
- moving, in conjunction with the cruise control indicator, the textual indication of the cruise control speed along at least the portion of the path corresponding to speed includes translating, sliding, and/or animating the textual indication of the cruise control speed along at least the portion of the path corresponding to speed.

11. A non-transitory computer-readable storage medium storing one or more programs configured to be executed by one or more processors of a computer system that is configured to communicate with one or more display generation components and one or more input devices, the one or more programs including instructions for:

- concurrently displaying, via the one or more display generation components and as part of an instrument cluster:
  - a cruise control indicator at a location that corresponds to a cruise control speed, and
  - a textual indication of the cruise control speed; and
  - a speed indicator that moves along a path corresponding to speed to indicate a current speed of a vehicle;
- receiving, via the one or more input devices, input to change the cruise control speed; and
  - in response to receiving the input to change the cruise control speed:
    - moving the cruise control indicator along at least a portion of the path corresponding to speed; and moving, in conjunction with the cruise control indicator, the textual indication of the cruise control speed along at least the portion of the path corresponding to speed.

12. The non-transitory computer-readable storage medium of claim 11, wherein the computer system is integrated into a vehicle.

13. The non-transitory computer-readable storage medium of claim 11, wherein displaying, as part of the instrument cluster, the cruise control indicator at the location that corresponds to the cruise control speed includes:

in accordance with a determination that a cruise control system of a vehicle is engaged, the cruise control indicator has a first appearance; and in accordance with a determination that a cruise control system of the vehicle is not engaged, the cruise control indicator has a second appearance that is different from the first appearance.

14. The non-transitory computer-readable storage medium of claim 11, wherein displaying, as part of the instrument cluster, the textual indication of the cruise control speed includes:

in accordance with a determination that a cruise control system of a vehicle is engaged, the textual indication of the cruise control speed has a third appearance; and in accordance with a determination that the cruise control system of the vehicle is not engaged, the textual indication of the cruise control speed has a fourth appearance that is different from the third appearance.

15. The non-transitory computer-readable storage medium of claim 11, wherein the cruise control indicator is displayed at a location along the path corresponding to speed.

16. The non-transitory computer-readable storage medium of claim 11, wherein the speed indicator fills in a region corresponding to the path and the filled region indicates the current speed of a vehicle.

17. The non-transitory computer-readable storage medium of claim 11, wherein the textual indication of the cruise control speed is displayed at a location corresponding to the cruise control speed.

18. The non-transitory computer-readable storage medium of claim 11, wherein the path is visually displayed.

19. The non-transitory computer-readable storage medium of claim 11, wherein the cruise control indicator and the textual indication of the cruise control speed are distinct.

20. The non-transitory computer-readable storage medium of claim 11, wherein:

moving the cruise control indicator along at least a portion of the path corresponding to speed includes translating, sliding, and/or animating the cruise control indicator along at least a portion of the path corresponding to speed; and moving, in conjunction with the cruise control indicator, the textual indication of the cruise control speed along at least the portion of the path corresponding to speed includes translating, sliding, and/or animating the textual indication of the cruise control speed along at least the portion of the path corresponding to speed.

21. A method, comprising:

at a computer system, wherein the computer system is in communication with one or more display generation components and one or more input devices:

concurrently displaying, via the one or more display generation components and as part of an instrument cluster:

a cruise control indicator at a location that corresponds to a cruise control speed, and a textual indication of the cruise control speed; and a speed indicator that moves along a path corresponding to speed to indicate a current speed of a vehicle;

receiving, via the one or more input devices, input to change the cruise control speed; and in response to receiving the input to change the cruise control speed:

moving the cruise control indicator along at least a portion of the path corresponding to speed; and moving, in conjunction with the cruise control indicator, the textual indication of the cruise control speed along at least the portion of the path corresponding to speed.

22. The method of claim 21, wherein the computer system is integrated into a vehicle.

23. The method of claim 21, wherein displaying, as part of the instrument cluster, the cruise control indicator at the location that corresponds to the cruise control speed includes:

in accordance with a determination that a cruise control system of a vehicle is engaged, the cruise control indicator has a first appearance; and in accordance with a determination that a cruise control system of the vehicle is not engaged, the cruise control indicator has a second appearance that is different from the first appearance.

24. The method of claim 21, wherein displaying, as part of the instrument cluster, the textual indication of the cruise control speed includes:

in accordance with a determination that a cruise control system of a vehicle is engaged, the textual indication of the cruise control speed has a third appearance; and in accordance with a determination that the cruise control system of the vehicle is not engaged, the textual indication of the cruise control speed has a fourth appearance that is different from the third appearance.

25. The method of claim 21, wherein the cruise control indicator is displayed at a location along the path corresponding to speed.

26. The method of claim 21, wherein the speed indicator fills in a region corresponding to the path and the filled region indicates the current speed of a vehicle.

27. The method of claim 21, wherein the textual indication of the cruise control speed is displayed at a location corresponding to the cruise control speed.

28. The method of claim 21, wherein the path is visually displayed.

29. The method of claim 21, wherein the cruise control indicator and the textual indication of the cruise control speed are distinct.

30. The method of claim 21, wherein:

moving the cruise control indicator along at least a portion of the path corresponding to speed includes translating, sliding, and/or animating the cruise control indicator along at least a portion of the path corresponding to speed; and moving, in conjunction with the cruise control indicator, the textual indication of the cruise control speed along at least the portion of the path corresponding to speed includes translating, sliding, and/or animating the textual indication of the cruise control speed along at least the portion of the path corresponding to speed.

* * * * *